(12) United States Patent
Yalamanchi et al.

(10) Patent No.: US 7,904,434 B2
(45) Date of Patent: Mar. 8, 2011

(54) FRAMEWORK FOR HANDLING BUSINESS TRANSACTIONS

(75) Inventors: Aravind Yalamanchi, Nashua, NH (US); Dieter Gawlick, Palo Alto, CA (US); Jayanta Banerjee, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 416 days.

(21) Appl. No.: 12/102,831

(22) Filed: Apr. 14, 2008

(65) Prior Publication Data

US 2009/0077135 A1 Mar. 19, 2009

Related U.S. Application Data

(60) Provisional application No. 60/972,557, filed on Sep. 14, 2007.

(51) Int. Cl.
*G06F 7/00* (2006.01)
*G06F 17/00* (2006.01)
(52) U.S. Cl. ........................................ 707/703; 707/704
(58) Field of Classification Search ........................ None
See application file for complete search history.

(56) References Cited

U.S. PATENT DOCUMENTS

| | | | | |
|---|---|---|---|---|
| 5,287,501 A | * | 2/1994 | Lomet | 707/648 |
| 5,701,480 A | * | 12/1997 | Raz | 718/101 |
| 2004/0088712 A1 | * | 5/2004 | Hickson et al. | 719/314 |
| 2005/0091658 A1 | * | 4/2005 | Kavalam et al. | 718/104 |

OTHER PUBLICATIONS

Agrawal et al "Constrained Shared Locks for Increasing Concurrency in Databases", Journal of computer and system sciences 51, 1995, pp. 53-63.*
Umeshwar Dayal et al "Business Process Coordination: State of the Art, Trends, and Open Issues", Proceedings of the 27th VLDB Conference, Roma, Italy, 2001, 11 pages.*

* cited by examiner

*Primary Examiner* — Uyen T. Le
(74) *Attorney, Agent, or Firm* — Hickman Palermo Truong & Becker LLP

(57) ABSTRACT

Techniques are provided for freeing up resources before operations that change the resources have successfully completed. Resources are freed up by committing database transactions that perform portions of operations before the operations themselves have successfully completed. If the operations fail to complete successfully, then "compensation information" is used to remove the effects of the committed changes that were performed as part of the operation. Techniques are also provided for allowing database transactions to update values without retaining exclusive locks on those values. Operational constraints set forth conditions that must be satisfied before an update is allowed to proceed. If an attempt is made to update a particular value that has changes that may be undone, then the database server determines a plurality of "possible result values" for the particular value. If the possible result values satisfy the operational constraint conditions, then the update is allowed to proceed.

50 Claims, 6 Drawing Sheets

A Business Transaction Spanning Two Sessions

FRAMEWORK FOR HANDLING BUSINESS TRANSACTIONS

PRIORITY CLAIM

The present application claims priority to U.S. Provisional Application No. 60/972,557, filed Sep. 14, 2007 entitled "FUNCTIONAL SPECIFICATION FOR BUSINESS TRANSACTION, RDBMS, 11.2", the entire contents of which are incorporated herein by reference.

FIELD OF THE INVENTION

The present invention relates to transaction management and, more specifically, to techniques that involve less restrictive locking while avoiding cascading abort situations.

BACKGROUND

In a traditional database system, the transaction management protocols and mechanisms are constrained by the fundamental properties of atomicity, consistency, isolation and durability (ACID). The transaction atomicity, which is the cornerstone of a transaction management system, states that a transaction either runs completely or has no effect on the system at all. The atomicity property indirectly impacts a transaction's ability to view the effects of another transaction while it is executing (visibility) and the database system's ability to recover in case of a failure (recoverability).

In a typical database system, a transaction's ability to view another transaction's uncommitted data is controlled using read locks or multi-version read consistent views of data. Write locks protect a transaction's uncommitted data from being seen and modified by some other transaction. These write locks are held until the end of the transaction and this is required to ensure that the system is recoverable.

A transaction management system with strict ACID properties is effective for conventional database applications involving short execution times (short transactions) and relatively small number of concurrent transactions (operating on the same data). However, it is excessively restrictive for applications that involve reactive, long-lived, and complex transactions.

For example, a complex transaction may involve making the arrangements for a band's world tour. Such arrangements may involve booking many flights, hotels, arranging car rentals, dining, etc. Completing all of the arrangements may take weeks. If the entire "world tour" transaction is modeled using a single database transaction, then certain records may remain locked to other transactions for the entire duration. For example, a record that indicates how many seats are available on a particular flight may remain locked (preventing other passengers from booking seats on the same flight) until the "world tour" transaction either commits or fails.

Keeping records locked for the duration of complex business transactions is impractical and inefficient. However, if a complex business transaction is modeled using several independent database transactions, other problems may occur. For example, assume that a part of a particular business transaction involves increasing the funds in an account. Further assume that the fund increase operation is performed as a distinct database transaction that is allowed to commit before the entire business transaction completes. After the fund increase transaction commits, other transactions are able to see the increased funds in the account. One of those other transactions may be a "withdrawal" transaction that withdraws more funds from the account than existed in the account prior to the funds increase.

If the business transaction that performed the funds increase does not complete successfully, then it will be difficult to undo the changes made by the partially-performed business transaction. In the current example, decreasing the funds of the account to undo the fund increase will leave the account with a negative balance, due to the subsequent withdrawal transaction. To avoid a negative balance, the withdrawal transaction may have to be undone before the fund update transaction is undone. Undoing the withdrawal transaction may necessitate the rollback of one or more additional transactions that relied on the changes made by the withdrawal transaction. Situations like this, where aborting one transaction may necessitate aborting one or more subsequent transactions, are known as "cascading abort" situations. It is clearly desirable for transaction management systems to avoid cascading abort situations.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
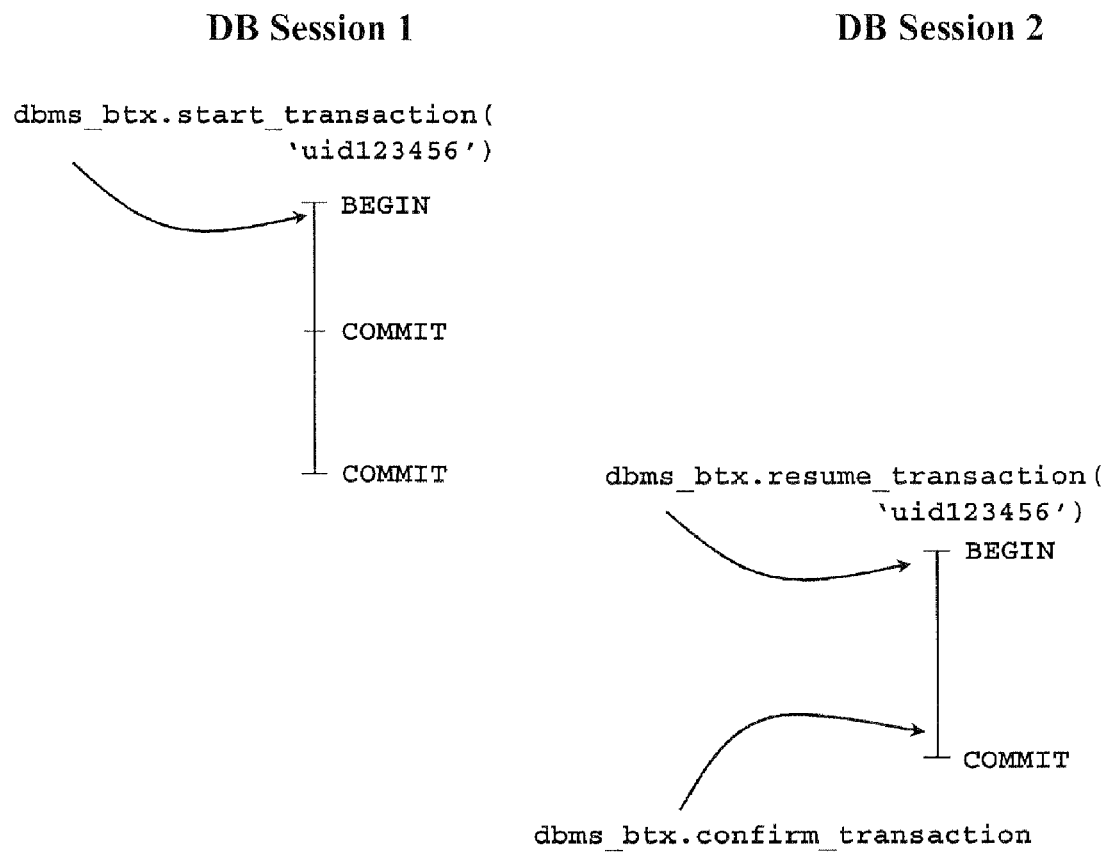
FIG. 1 is a block diagram illustrating a single business transaction that spans multiple sessions, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for freeing up resources before the business transactions that change the resources have successfully completed. According to one embodiment, resources are freed up by committing database transactions that perform portions of operations before the operations themselves have successfully completed. If the operations fail to complete successfully, then "compensation information" is used to remove the effects of the committed changes that were performed as part of the operation. The compensation information indicates the relative effect of the committed changes, so that the relative effect of the changes can be removed without removing the effect of changes made to the resource by subsequent transactions. Because the effect of changes made to the resource by subsequent transactions are not undone, application of the compensation information does not result in a cascading abort situation.

Techniques are also provided for allowing database transactions to update values without retaining exclusive locks on those values. Consequently, even before a first transaction that changed a value commits, a second transaction is allowed to change the same value. If the first transaction fails to commit, the effect of changes made by the first transaction are removed by applying compensation information. The application of the compensation information removes only the effects of the changes of the first transaction, so the effects of the second transaction continue to be reflected by the value. Consequently, if the first transaction aborts, the second transaction does not necessarily have to abort.

A mechanism for specifying operational constraints is provided. Operational constraints set forth conditions that must be satisfied before an update is allowed to proceed. If an attempt is made to update a particular value that has changes that may be undone, then the database server determines a plurality of "possible result values" for the particular value. If the possible result values satisfy the operational constraint conditions, then the update is allowed to proceed. Otherwise, the update is not allowed to proceed. In one embodiment, if the operational constraint condition is satisfied by at least one of the possible result values, but is not satisfied by at least one of the possible result values, then the transaction that is attempting to perform the update may be placed on a "waiting list".

Business Transactions: Overview

As mentioned above, techniques are provided for allowing a long-duration business transaction, which maintains unconfirmed data manipulations (DML Operations), until the end of the transaction, without holding exclusive locks on the impacted rows. In this model, a business transaction consists of one or more short-duration (traditional) database transactions, which are used to manipulate the data, and the locks on the impacted rows are only held for the duration of the corresponding database transaction. An improved database system allows concurrent business transactions to share and manipulate unconfirmed data and ensures correctness through semantic (business transaction) atomicity and isolation. Further, the cascading aborts phenomenon is avoided with the use of operational constraints.

Business transactions may be used, for example, for implementing business processes that can be broken into shorter database transactions. The database transactions within a business transaction follow strict ACID properties and use traditional row-level locks for concurrency control. In applications dealing with hot spots, row-level locks held until the end of the database transaction may prove too restrictive. The hot spots are identified as highly volatile fields, which maintain some aggregate quantities such as "number of seats available" or "number of items in stock". An escrow mechanism that allows concurrent updates to hot spot fields will be discussed in greater detail hereafter. The escrow mechanism can also be used outside the context of Business Transactions.

Operational Constraints

In the existing implementations of database systems, recoverability is guaranteed by ensuring that all operations on a particular data item are serialized with the use of row-level locks. Theoretically, the ability to serialize a set of concurrent operations is a characteristic of the data being operated on and the types of operations. For example, in an Airline Reservation system, two concurrent "reserve seat" operations can be serialized as long as the sum of the seats reserved by both the transactions is below the available capacity. In a traditional database system, one of the transactions initiating the "reserve seat" operation blocks the other request until the commit of the transaction.

According to one embodiment, the request is not automatically blocked until the transaction commits. Instead, an Operational Constraint mechanism is used to allow concurrent operations to succeed based on the compatibility of the operations. While using operational constraints to serialize concurrent operations on a data item, application-dependent atomicity or the semantic atomicity of the business transaction is achieved with the use of Business Transactions.

Operational Constraints are used as a concurrency control mechanism in which a database operation (DML) succeeds (to acquire the lock and update the value) only if the operation satisfies a constraint associated with the data being modified. According to one embodiment, the constraints are user-specified Boolean conditions, which are expressed using a set of pseudo variables and the table metadata. For instance, a hypothetical constraint that supports the logic defined in the previous Airline Reservations example can be expressed as CurrentCapacity>=0. (Note that this constraint works only if the uncommitted changes to the CurrentCapacity column always decrement the value. An example where an operation incrementing this value is uncommitted will be discussed in greater detail hereafter).

Pseudo Variables for Operational Constraint Conditions

For a system to allow concurrent manipulation of uncommitted data in multiple business transactions, the constraint validation is often based on different versions of each data item: current, confirmed, and visible. According to one embodiment, these versions of data are accessed using pseudo variables btx_current, btx_confirmed, and btx_ projected, respectively. The semantics for the usage of these pseudo variables (E.g.: btx_current.CurrentCapacity>=0) in the Operational Constraints are as follows:

btx_confirmed: This refers to the last known committed version of the data and excludes the effect of any uncommitted changes in the active transactions. For example, if a Flight segment has 60 seats of which 20 seats are reserved in some active transactions. The btx_confirmed version of capacity column has a value 60.

btx_current: This refers to the version seen within an active (business) transaction. During the execution of a DML statement, the btx_current.<column_name> refers to the new value being set for the column and its usage in an Operational Constraint definition is exactly similar to the use of: new.<column_name> in a BEFORE ROW TRIGGER. For the above example, if an active transaction reserves two seats with an update statement (CurrentCapcity=CurrentCapacity−2), the btx_current version of a column has the value resulting from the update statement.

btx_projected: Within an active transaction, this refers to the version of data that includes the effects of all other uncommitted changes to data and is hence visible to the current transaction. Note that the btx_projected version excludes the effect of changes made in the business transaction from which the value is computed. For the above example, at the time of executing the update statement, with 20 seats reserved by some uncommitted transactions, the btx_projected version of the capacity column has a value of 40. Note that after the successful execution of the update statement, which reserves 2 seats within a transaction, the value stored in the corresponding column is 38. If the same transaction executes another update statement to reserve 3 additional seats the effect of prior reservation (2 seats) is excluded while computing the projected version. So, for the second update statement the btx_projected version of the capacity column still has 40 (assuming no other concurrent operations are executed between the update statements). In other words, the difference between btx_projected and btx_current versions of the capacity in this case has total number of resources held by the current business transaction at the end of the last DML statement.

Operators for Operational Constraint Conditions

In addition to the pseudo variables discussed above, additional domain specific operators are provided to access certain computed values for the operational constraints. For instance, when a column in a table is associated with MEASURE semantics, implying that the operations on the column either increment or decrement the value, two operators, BTX_MEASURE_INCR and BTX_MEASURE_DECR, return the sum of all increments and decrements on the field respectively and these can be used to define a constraint which work with bidirectional uncommitted changes to some value. All the above examples assume that only the Reserve operations (which decrement the available capacity) are modeled as business transactions. However if an Un-reserve operation (which increments the available capacity) is also modeled as a business transaction, the constraint definition should account for a range of uncommitted values, as shall be discussed in greater detail hereafter.

Using Pseudo Variables and Operators

The pseudo variables providing access to different versions of each data item can be used to express the constraints that control the concurrent modification of data. For instance, if the value stored in a VARCHAR column can be modified only when there is no other uncommitted change, the corresponding constraint can be expressed as btx_confirmed.CurrentStatus=btx_projected.CurrentStatus. That is, a transaction can modify the value stored in the CurrentStatus column only if there is no other uncommitted change to the value (confirmed version of the value is same as visible version implying that there is no effect from any uncommitted transactions). Note that such operational constraints indirectly support column-level locking for business transactions.

Using operational constraints, a database operation may be allowed to modify some visible (dirty) data as long as the new value is compatible with the other two versions of the data. This can be used to model desirable lost update scenarios in business applications. For example, if the status of a document is set to 'Sensitive' and is uncommitted, a concurrent operation which overwrites this value to 'Confidential' may be allowed with a constraint—btx_projected.Status='Sensitive' and btx_current.Status='Confidential'.

Business Transactions

A business transaction is an abstract representation that models a real-world business transaction and keeps its state consistent with the state of that transaction. A typical business transaction is long lasting and it may span multiple IT processes/sessions (For example: Workflow, Airline Reservation).

In current transaction management systems, a typical database transaction cannot span multiple processes and they may cause serious performance problems when the transactions are long lasting. The problems arising from database transactions that model long-lasting business transactions are two fold: 1) The locks held by an active transaction may force other transactions to wait for resources for an unacceptably long period, and 2) A long duration transaction increases the likelihood of abort (owing to application deadlocks), which in turn results in the whole transaction being undone and possibly repeated.

According to one embodiment, a business transaction includes one or more traditional database transactions spanning multiple sessions. FIG. 1 is a block diagram illustrating a single business transaction that spans multiple sessions. Referring to FIG. 1, a business transaction uid123456 starts executing in DB Session 1. Within DB Session 1, the business transaction includes a database transaction that begins and commits in DB Session 1. During DB Session 2, the same business transaction uid123456 resumes execution. Within DB Session 2, the business transaction includes a database transaction that beings and commits in DB Session 2. The business transaction uid123456 only "confirms" at the end of DB Session 2.

Preferably, a business transaction has a persistent representation and survives all types of database failures and restarts. The database transactions within a business transaction are expected to be short and in some extreme cases they can be self-committing database activity, where each database interaction starts a new transaction and commits immediately after executing the statement. However, since the database transactions are still under application control, concurrent database transactions may lock each other out on highly volatile/active data. Various techniques for handling such hot spots within database transactions shall be described in greater detail hereafter.

The possible external states of a business transaction are analogous to that of a database transaction: Begin, Confirm, and Abort. The database transactions that constitute a business transaction ensure data consistency by validating operational constraints for all relevant DML operations and by using traditional locks on necessary resources, which are only held for the duration of the database transaction. Between two database transactions, the state of a business transaction is persistently stored in the database. If a failure occurs in a database transaction, it can be retried while the business transaction preserves its last known state. Following a database failure, the traditional recovery process restores the state of the business transaction to the last successful database transaction.

The effects of a business transaction are made visible immediately after each database transaction. A concurrent business transaction can view and edit the unconfirmed data, thereby allowing shared updates to common data. Weak serializability for the concurrent operations performed on common data is ensured by application enforced operational constrains. The user defined-operational constraints can be used to ensure application correctness for all possible outcomes of the active business transactions and they guarantee that the operations performed within a business transaction can be compensated. Note that the operational constraints may be defined to cause lost-updates if they are desirable in the applications.

A business transaction in the database is demarcated using procedural interfaces that begin and confirm or abort the transaction. An active business transaction has a unique identifier within a database schema and this identifier is used with PL/SQL interfaces to begin, suspend, resume, confirm, and abort a business transaction. At the time of creation, a timestamp (or interval) for expiry and the default action upon expiry can be specified for the business transaction. Alternately, a business transaction profile, which defines various parameters for a business transaction, can be specified with transaction creation. The following is an example of how a business transaction may be specified:

```
begin
    dbms_btx.begin_transaction (
        trans_key    => 'UID123456',
        expiry_ts    => systimestamp+7,
        expiry_act   => dbms_btx.ABORT);
end;
```

Once a business transaction is started in a database session, all subsequent DML operations on tables with operational constraints are considered to be part of the business transaction. The business transaction can span multiple database transactions (within the session) and it can be suspended with a dbms_btx.suspend_transaction command or with the end of the database session. A suspended business transaction can be resumed for additional operations using the dbms_btx.resume_ transaction command. Note that a business transaction is associated with the user/schema creating it and all the subsequent sessions associated with the business transaction should be for the same user/schema, with the exception of Distributed Transactions.

According to one embodiment, no more than one business transaction can be active in a database session, and resuming or creating a new business transaction will automatically suspend the session's currently active business transaction. Two concurrent sessions cannot simultaneously make use of (resume) the same business transaction.

An example of code for resuming a business transaction, according to an embodiment of the invention, is as follows:

```
begin
    dbms_btx.resume_transaction (trans_key => 'UID123456');
end;
```

According to one embodiment, a business transaction can be ended with a dbms_btx.confirm_transaction or a dbms_btx.abort_transaction command, which prepares the business transaction to make all its operations permanent or undoes them, respectively. In the example illustrated in FIG. 1, business transaction uid123456 is ended with the dbms_ btx.confirm_transaction command.

Note that, in one embodiment, the commands managing a business transaction (begin, confirm, and abort) occur within the context of an existing database transaction, and their effects can be committed or undone with the corresponding database transaction issuing a COMMIT or ROLLBACK. For instance, a database transaction with a dbms_btx.confirm_transaction call can rollback, resulting in the cancellation of the business transaction's confirm operation.

In one embodiment, the transaction identifier set by the dbms_btx.begin_transaction command, and subsequently used by the dbms_btx.resume_transaction command, is internally used to journal all the relevant DML activity in the transaction. This information is, in turn, used to evaluate operational constraints and perform compensating actions for the DML activity, in case of a transaction abort.

Since the business transactions collect journal information for the objects with operational constraints, a database transaction associated with a business transaction may not exclusively belong to a business transaction. DML operations on tables with no operational constraints follow traditional transaction management. Also, a single database transaction can suspend an active business transaction and resume another business transaction if necessary. When a database transaction with no active business transaction manipulates an object with operational constraints, a system generated business transaction is assumed to exist (created with first DML operation on the relevant object) for the duration of the database transaction. Such business transactions are automatically confirmed with the commit of the database transaction and there will be no trace of the transaction in the journal if the database transaction rolls back.

Business Transaction Profiles

A business transaction profile defines the characteristics that are common to a set of business transactions. For example, the business transactions used for Order Management system may have a common expiry policy. Such transactions may also use a common set of callback routines to perform housekeeping operations at the time of transaction confirmation and abort. A reusable profile can be created in a user schema such that all the corresponding business transactions can specify the name of the profile to derive all its properties. The following is an example of code for creating a transaction profile, according to an embodiment of the invention:

```
begin
    dbms_btx.create_profile (
        profile_name  => 'OrderMgmt',
        expiry_int    => interval '3' day,
        expiry_act    => dbms_btx.ABORT,
        confirm_cbk   => 'ConfirmOrder',
        abort_cbk     => 'AbortOrder');
end;
```

A business transaction can use one of the existing transaction profiles to determine its characteristics, as illustrated by the following code:

```
begin
    dbms_btx.begin_transaction(
        trans_key   => 'OrderEntry_tx3',
        trans_prof  => 'OrderMgmt');
end;
```

Data Model

One or more relational tables in a database schema can be enabled for business transactions, which in turn assigns default operational constraints to the columns in the tables. Such tables can coexist with the database objects that follow traditional transaction management. Enabling a table for business transactions allows the database to maintain the necessary metadata for deriving the values for pseudo variables used in operational constraints, evaluate these operational constraints at runtime, and maintain the necessary information for compensating actions, should the business transaction abort. The following command enables the Reservations table for business transactions and defines a default operational constraint for each column in the table. The default operational constraint ensures that there is only one unconfirmed change to any value in the table and hence none of the business transaction operations are lost.

```
begin
    dbms_btx.enable_object (table_name = > 'Reservations');
end;
```

Operational Constraints are used to manage the semantic correctness of data through all modifications made by concurrent business transactions. Operational Constraints are specified as Boolean conditions that should evaluate to true for the current database operation (UPDATE) to succeed. The Boolean conditions are expressed in terms of different versions of the column data for which the constraint is defined. The version of the data last confirmed by some business transaction is accessed using btx_confirmed.<column_name>, the version resulting from the current statement is accessed using btx_current.<column_name> and the version that includes the effects of all other uncommitted business transactions up to the current statement is accessed using btx_projected.<column_name>. Since the constraints are evaluated only for an active UPDATE statement, the pseudo variables exist only within the context of the UPDATE statement.

The INSERT operations within the context of a business transaction are managed by an implicit constraint that only allows the owning transaction to modify it. Although the concurrent business transaction can view the newly inserted row (after the completion of corresponding database transaction), they cannot modify it until the owning transaction confirms its operations. Similarly an implicit constraint prevents a DELETE operation on any table rows with some unconfirmed changes to the same row by concurrent business transactions.

The constraints managing concurrent UPDATE operations are user defined and a default constraint is assigned when the table is enabled for business transactions. The default constraint, which ensures that there is only one unconfirmed change to any value, is defined using the Boolean condition of the form "(btx_confimed.<column_name> is null and btx_projected.<column_name> is null) or btx_confirmed.<column_name>=btx_projected.<column_name>". This default constraint can be relaxed for some of the columns in a table using the dbms_btx.set_constraint interface. For example:

```
begin
    dbms_btx.set_constraint   (table_name   => 'Reservations',
                               column_name  => 'CurrentCapacity',
                               constr_expr  =>
                'btx_current.CurrentCapacity >=
 (btx_confirmed.CurrentCapacity –
                    BTX_MEASURE_DECR(CurrentCapacity))',
                               data_class   => dbms_btx.MEASURE);
end;
```

The above operation modifies the default constraint associated with the CurrentCapacity column of the Reservations table. Data classification methodology MEASURE is used for columns storing measurable data such as capacity, count, etc. The unique characteristic about such data is that all operations on the data are commutative. The default form of data classification methodology is CATEGORY, the domain for which is a finite number of categories (For example—{'SENSITIVE', 'CONFIDENTIAL', 'HIGHLY CONFIDENTIAL'}).

The conditional expression specified for an operational constraint may make use of session context in its predicates. For instance, an operation constraint may be defined to allow any user with VP role to simply overwrite any confirmed or unconfirmed value for a column. The user role can be established using secure application context (as defined by Fine-Grained Access Control feature) and the corresponding predicate SYS_CONTEXT('appctx','userrole')='VP' can be specified in the constraint expression.

According to one embodiment, the operational constraint associated with a table column is evaluated only when an update statement modifies the value in a specific column. If some constraint should be enforced for all UPDATE operations independent of the columns modified in the statement, a table-level operational constraint may be defined. The table-level operational constraint can be expressed using the confirmed, projected and current values for any of the columns in the table as well as the session context. Unlike the operational constraints that are assigned to specific columns, a table-level operational constraint is evaluated for all update operations on the table. The default table-level operational constraint is always true (1=1) and it can be modified using the dbms_btx.set_constraint interface with ROWID assigned for the column_name argument and a NULL value assigned to the data_class argument.

In order to provide access to different versions of data and manage the business transaction semantics (make the changes permanent with the end of a business transaction or undo the changes in the case of an abort), the database maintains pertinent information about each DML operation executing within a business transaction. This information is efficiently managed in the dictionary tables. In these dictionary tables, the identity of the modified data is maintained using the ROWID of the corresponding row. So conflicting operations on a column data are crosschecked using the ROWID of the row in conjunction with its column index. In the dictionary, the effect of multiple operations on the same data item within a business transaction is consolidated and only the net effect is captured (For example: INSERT followed by UPDATE is captured as INSERT, UPDATE followed by DELETE is captured as DELETE etc.)

In one embodiment, index-organized tables are enabled for business transactions, provided that the operations on their primary key columns are made permanent within the database transaction (cannot be rolled back with the business transaction).

Compensation Through Semantics

When a business transaction is aborted, the effects of all the DML operations performed over the lifetime of the transaction should be undone. Since the outcome of these DML operations was exposed to concurrent transactions prior to the abort, a traditional log based undo where the current value is replaced with a prior copy of the same value may not be appropriate. Instead, a logical undo, based on the semantics of the data should be performed. Logical undo for an operation originally performed in the transaction is modeled as a compensating action that should be performed on the current version of data. Thus, the information that indicates the compensating actions that need to be performed to undo the effects of a business transaction is referred to herein as "compensation information".

The data classification methodology specified at the time of constraint definition (with dbms_btx.set_constraint interface) determines the compensation technique used for the data stored in the corresponding column. In one embodiment, the database server recognizes several types of data classification methodologies with pre-defined compensation logic: (1) MEASURE and change-based compensation, and (2) CATEGORY and time-priority compensation, (3) LATTICE and Position-priority compensation, and (4) Custom compensation. Each of these shall be described in detail hereafter. Further, the extensible nature of the business-transaction architecture allows custom compensation logic to be implemented in PL/SQL and plugged-in for data with special characteristics.

Measure and Change-Based Compensation

Data classification methodology MEASURE is used for columns storing measurable data such as capacity and count. The SQL data type for such columns is always a NUMBER and the update operations on such data either increase or decrease the value by a specific count. For example, in an online bookstore application, the Inventory table has a column to store the number of each type of books in stock. Placing a book in the shopping cart reduces the count against a specific book type by 1 and this column is thus configured with MEASURE for relevant compensation logic.

If an update operation on some data identified as MEASURE changes it by $\partial$, then the corresponding compensating action is to adjust the current value by $-\partial$. In the previous example, if the shopping transaction is aborted, the number of books on stock is incremented by 1 (to compensate for the decrement operation in the transaction). Owing to other concurrent transactions executed between the two operations, the compensating action in this case does not guarantee that the number of books on stock is reverted back to the original value but to a consistent current value.

A column categorized as MEASURE can allow both increment and decrement operations through normal database activity. Both increment and decrement operations could be part of uncommitted business transactions and the net value (committed value−sum of all the decrements+sum of all increments) is the projected version of data.

Figure 2:
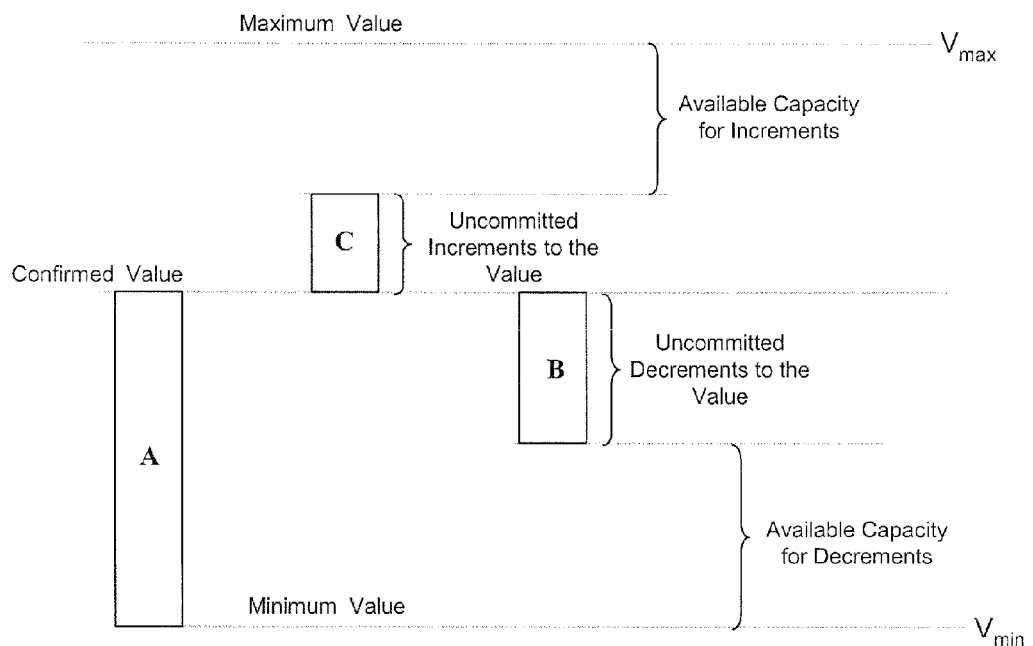
FIG. 2 is a block diagram that illustrates a situation in which the confirmed value (A) has been updated with a set of unconfirmed increments (C) and a set of unconfirmed decrements (B), according to an embodiment of the invention.

Referring to FIG. 2, it illustrates a situation in which the confirmed value (A) has been updated with a set of unconfirmed increments (C) and a set of unconfirmed decrements (B). The available capacity for increments is the difference between the maximum value Vmax and (A)+(C). Thus, the available capacity for increments assumes that all unconfirmed increments will ultimately succeed, and all unconfirmed decrements will ultimately fail.

On the other hand, the capacity for decrements is the difference between the minimum value Vmin and the ((A)−(B)). Thus, the available capacity for decrements assumes that all unconfirmed increments will fail, and all unconfirmed decrements will succeed.

In other words, any operation decrementing the value should exclude the effect of all uncommitted increments and vice versa while checking the legality of the current update operation. This ensures that the operation is still valid regardless of whether the other business transactions succeed or abort. For this purpose, two operators, BTX_MEASURE_INCR and BTX_MEASURE_DECR are provided to return the sum of all uncommitted increments and decrements on a MEASURE column, respectively. For any MEASURE column, the following equation holds true.

$$btx\_projected.<column> = \\ btx\_confirmed.<column> - BTX\_MEASURE\_DECR (<column>) \\ + BTX\_MEASURE\_INCR (<column>)$$

For the travel services example described above, if the value for the CurrentCapacity column should be below a certain maximum value (stored in another column, MaxCapacity, in the same table), the constraint associated with the column should be rewritten as follows:

$$btx\_current.CurrentCapacity\ between \\ BTX\_MEASURE\_INCR(CurrentCapacity)\ and \\ (MaxCapacity - BTX\_MEASURE\_DECR(CurrentCapacity))$$

The generic operational constraint on a MEASURE column, which has a finite range of values, is as follows.

$$btx\_current.<column>\ between\ (MinValue + \\ BTX\_MEASURE\_INCR\ (<column>))\ and \\ (MaxValue - BTX\_MEASURE\_DECR\ (<column>))$$

According to one embodiment, for a DML operation incrementing or decrementing a MEASURE value, btx_current.<column>−btx_projected.<column> is the magnitude of change that should be compared against corresponding available capacity (for increment and decrement respectively). The difference between the current and projected values is negative for a decrement operation and positive for increment operation. So, for an increment operation to be valid, the absolute value of change should be less than or equal to [Maximum Value−(A+C)].

$$btx\_current.<column> - btx\_projected.<column> <= \\ MaxValue - (btx\_confirmed.<column> + \\ BTX\_MEASURE\_INCR(<column>))$$

Similarly, for a decrement operation, the absolute value of change is less than or equal to [(A−B)−Minimum Value]. Since the actual change is negative, this can be expressed as follows.

$$btx\_current.<column> - btx\_projected.<column> >= \\ MinValue - (btx\_confirmed.<column> - \\ BTX\_MEASURE\_DECR(<column>))$$

Assuming that available capacities are zero or positive prior to each operation, the above two predicates should hold true for all operations on the corresponding data (note that the predicate for decrements is always true for increment operations and vice versa). So, the two predicates can be rewritten as follows:

```
    btx_current.<column> <= MaxValue +
        btx_projected.<column> -
            (btx_confirmed.<column> +
                BTX_MEASURE_INCR(<column>))
AND
    btx_current.<column> >= MinValue +
        btx_projected.<column> -
            (btx_confirmed.<column> -
                BTX_MEASURE_DECR(<column>))
```

By applying the equation for btx_projected.<column> from the previous page, these predicates can be expressed as follows.

```
btx_current.<column> <= MaxValue - BTX_MEASURE_DECR
(<column>)
AND
btx_current.<column> >= MinValue + BTX_MEASURE_INCR
(<column>)
```

Thus, the exact predicate for a MEASURE column that should be restricted to a range is expressed as follows.

```
btx_current.<column> between    (MinValue +
    BTX_MEASURE_INCR            (<column>)) and
                                (MaxValue -
    BTX_MEASURE_DECR            (<column>))
```

Category and Time-Priority Compensation

A CATEGORY data classification methodology is used for columns that can take values from a finite set of independent categories. The characteristics of such a column are that the values are not derived or derivable from other column values in the same or the other tables (generally the database state) and the arrival order of operations that manipulate this column is significant. For instance, a column in a Project tracking table may capture the status of a collaborative project. The value may be set by multiple concurrent transactions provided that they satisfied the operational constraints. The confirmed value for a document's access policy could be OPEN. The first business transaction may update the value to SENSITIVE and suspend the transaction. A second business transaction may later set the value to CONFIDENTIAL (provided the operational constraint evaluates to true).

When the status column is configured with CATEGORY, the order in which the concurrent transactions manipulated the value is significant. Among the concurrent transactions that update a value, a confirmed transaction, which is also the last one to update the value, prevails. So, for the previous example, if the second business transaction confirms, the document access policy CONFIDENTIAL becomes the access policy independent of the state of the first transaction. But if the second transaction is aborted, the value is reverted back to SENSITIVE until the first transaction itself is aborted.

The projected value for a column configured with CATEGORY is the value last set by an open business transaction. For simplicity let us assume that the value for the status field of a project is set to 1, 2, 3, 4, 5 in this order by five concurrent business transactions. The information about the values set by the individual transactions and their order of execution is maintained in the dictionary. The last transaction in this order is significant in that only when this transaction is aborted does the value accessed through the pseudo variable btx_projected change. With the abort of any other transaction, the dictionary entries are adjusted to retain the order among the remaining business transactions and the value accessed through btx_projected variable remains unchanged.

When the operational constraint for a CATEGORY column is defined using the projected value, a concurrent update operation may be allowed only because an unconfirmed projected value meets certain criteria. In effect, the update operation is dependent on the state of another transaction, which may or may not confirm. This may not be desirable if an aborted business transaction should have no effect on the resulting states of the database. Only exception to this rule is when the constraint is written to enforce a deterministic monotonic pattern among unconfirmed values. For example, if the column that stores the Bid Value is configured with CATEGORY, a constraint may be defined to allow new bids (updated bid value) only if the current value is greater than the last projected value. Using this constraint, the values can be guaranteed to increase monotonically even if one or more of the intermediate business transactions abort.

According to one embodiment, a constraint for CATEGORY type is evaluated for all possible outcomes. That is, if the data has three unconfirmed values from three different transactions, the same constraint is evaluated multiple times with different projected values each time. Alternatively, this behavior may be implemented as separate data classification type. For example, assume that the confirmed value is OPEN and two unconfirmed values (in order) are SENSITIVE and HIGHLY SENSITIVE and the current operation is setting the value to CONFIDENTIAL. Under these conditions, the following predicate may be evaluated two ways:

```
btx_projected.accessPolicy = 'HIGHLY SENSITIVE' and
    btx_current.accessPolicy = 'CONFIDENTIAL'
```

According to a first option, all possible outcomes may be used to evaluate the predicate. Under this option, the projected values could take three values, depending on state of the two unconfirmed transactions. So, when evaluated with all three of them, the constraint fails and restricts the current operation.

According to a second option, the system only evaluates the constraint with the projected value at the time of the operation. If this option is used, then this constraint is poorly formed, as it should consider the confirmed value and not the projected value for controlling specific transitions in value.

Lattice and Position-Priority Compensation

As mentioned above, the column marked for time priority compensation only considers the time of operation while determining the prevailing value. That is, when concurrent business transactions modify the same value (while satisfying the operational constraints), the last operation that is confirmed with the corresponding business transaction confirm operation prevails. The actual values set by each operation are only considered for evaluating the operational constraint and they do not play a role in the compensation mechanism.

In contrast, position priority compensation uses a domain-specific lattice structure to determine the resulting value when multiple operations on a value confirm or abort. An implicit operational constraint on a column marked for position priority compensation allows multiple transactions to reset a value stored in a field to any value that is connected to the confirmed value and has higher position in the lattice. In the associated lattice structure, if an order does not exist between the values set by two unconfirmed transactions, the value resulting from confirming all such transactions is the lattice element identified by the meet of the corresponding elements (values set by transactions).

According to one embodiment, when position priority compensation is used, a lattice structure is defined in a database schema. A lattice structure (by its name) is associated with the column of a table. Users specify operational constraints with Lattice type. If the unconfirmed changes are restricted to follow the position priority with the projected value, the LATTICE structure can be mapped to CATEGORY type, with specific predicate in the operational constraint.

Custom Compensation

The simple compensation techniques discussed for MEASURE and CATEGORY data may not be suitable for data that is derived from the current state of the database. Within a business transaction, the state based on which a value is derived may be partly uncommitted. For instance if transaction T1 changes the state of the database from S0 to S1 and a concurrent transaction T2 uses the uncommitted state S1 to arrive at a state S2, the transaction T1 may have played a significant role in the final state S2. When transaction T1 is aborted at a later point in time, the effects of this transaction on the final state cannot be easily undone. Such applications may revert to application specific compensation logic.

If the compensation for some forms of data follows a deterministic logic, new data classification types and the corresponding compensation logic implemented in PL/SQL can be added using an extensibility framework. Alternately, the existing compensation logic in application tiers may be migrated to the database and invoked using the business transaction's abort callback mechanism. When a business transaction is aborted, the callback procedure will be invoked and the callback procedure can be programmed to apply the compensation logic.

Compensation for Insert/Delete

The compensating operation for an INSERT performed in a business transaction is a DELETE operation and vice versa. For example, in the travel services application, if a seat assignment for a reserved seat is captured as an INSERT statement into a corresponding table, these newly inserted rows are deleted upon transaction abort.

Operational Characteristics

A traditional SQL query on a table enabled for business transactions returns the Current version of the data as the result set. This version includes the effect of all concurrent uncommitted business transactions as well as any modification made within the database transaction issuing the query. For instance, the following query on the Reservations table, which is enabled for business transactions, returns the Capacity that is adjusted for unconfirmed (business-transaction) changes. For example, if two active business transactions hold two seats each and the confirmed value stored in the CurrentCapacity column is 60, the value returned by the following query is 56.

```
SELECT CurrentCapacity FROM Reservations
WHERE FlightNo = 'UA123'
```

A confirmed view of the same data, which excludes effect of any active business transactions, can be obtained by using the following query with BTX_CONFIRMED operator. This query returns 60 for the above scenario.

```
SELECT BTX_CONFIRMED(CurrentCapacity) FROM Reservations
WHERE FlightNo = 'UA123'
```

Standard DML syntax is used to manipulate the data stored in a table enabled for business transactions. Within a database session, DML operations on such tables can be interspersed with operations on other database objects. The semantics for each DML statement are determined based on the state of the database session (if associated with an active business transaction or not) and the properties of the underlying object. Traditional transaction management principles may be used for operations/objects that fall outside the context of business transactions.

According to one implementation, the pseudo variables, btx_confirmed, btx_projected, and btx_current, only exist within the context of Operational Constraints and they cannot be used in a normal query or a DML statement.

Update Operation

Continuing with the previous example, an attempt to reserve 3 seats on the flight UA123 is expressed using the following UPDATE statement on the Reservations table.

```
UPDATE Reservations SET CurrentCapacity =
CurrentCapacity-3
WHERE FlightNo = 'UA123' and origDate = '01-JUL-2007'
```

The operational characteristics for the above UPDATE statement are as follows:
1. Using the confirmed, projected, and current values for the columns in the table, evaluate the relevant operational constraints and determine the validity of the current operation. If the constraint evaluates to false, fail with an appropriate error. Else continue.
2. Update the value stored in the CurrentCapacity column. This step is successful only if the updated value satisfies all the relevant data integrity constraints (Referential, Uniqueness, Check etc.).
3. If the database transaction issuing the UPDATE statement does not have an active business transaction associated with it, go to Step 4 else go to Step 5.
4. The current statement is assumed to run in a system generated business transaction, which is bound to confirm with the current database transaction. Adjust the dictionary accordingly and return.
5. Capture the nature of the change as well as the business transaction's identifier in the dictionary.

For columns configured with MEASURE, the amount of change (increment or decrement) performed by an update statement is derived by subtracting the old value of the column from the value being set. All computations are based on the current version of data (prior to the update), which includes the effects of concurrent business transactions as well as the changes made by the current transaction up to that point.

For example, an update statement with SET CurrentCapacity=Foo(CurrentCapacity), uses the resulting value from executing the Foo function (at that instance) on the current version of the CurrentCapacity column to compute the net change in value.

Insert Operation

Rows are inserted into a table enabled for business transactions using the standard INSERT syntax. The following insert statements into the SeatAssignment table when associated with the above business transaction are either committed or aborted together.

```
INSERT INTO SeatAssignment (FlightNo, SegmentId, . .,
SeatNo) VALUES
     ('UA123', 34526, . .., '12A');
INSERT INTO SeatAssignment (FlightNo, SegmentId, . .,
SeatNo) VALUES
     ('UA123', 34526, . .., '12B');
INSERT INTO SeatAssignment (FlightNo, SegmentId, . .,
SeatNo) VALUES
     ('UA123', 34526, . .., '12C');
```

The operational characteristics for the INSERT operations are as follows:
1. Insert the new rows into the corresponding table honoring all the data integrity constraints associated with the table (Referential, Uniqueness, Check etc.).
2. If the database transaction issuing the INSERT statement has an active business transaction associated with it, capture the metadata necessary to confirm or abort this operation with the business transaction.

The business transaction metadata captured for an INSERT operation includes a list of ROWIDs for the newly inserted rows along with the transaction identifier. The rows inserted by an unconfirmed business transaction are visible to other business transactions. However such rows cannot be updated or deleted by concurrent transactions until the owning transaction confirms. In one embodiment, the query to fetch a consistent view of the data (prior to committing the business transaction) using the BTX_CONSISTENT table function will automatically exclude these newly inserted rows.

Delete Operation

Rows are deleted from a table enabled for business transactions using the standard DELETE syntax. An operation deleting one or more rows from such table has following operational characteristics.
1. If the row being deleted has one or more pending changes from unconfirmed business transactions, fail with an appropriate error. Else continue.
2. If the database transaction issuing the DELETE operation does not have an active business transaction associated with it, delete the row following the traditional transaction management semantics and return.
3. When an active business transaction is associated with the DELETE operation, insert the row(s) to be deleted into a common catalog table, which stores each column value in AnyData format and then delete the row from the table. Alternately, the dictionary can record the ROWIDs and the flash back version number for the deleted rows to facilitate recovery in the case of a transaction abort.

A query to fetch a consistent view of data using the BTX_CONSISTENT table function will reconstruct the uncommitted deleted rows and includes them in the result set of the query.

In an alternative embodiment, the rows are marked as deleted by simply recoding the relevant metadata in the dictionary. The rows are permanently deleted from the table when the business transaction commits.

Committing a Business Transaction

A business transaction is considered committed when a database transaction confirming the business transaction is itself committed. The Data Model supporting business transactions is designed with the assumption that most business-transactions eventually commit. Hence the information maintained for a business transaction is optimized for such operations.

For a table enabled for business transactions, the physical state of the data stored in the user tables includes the effects of all uncommitted business transactions up to the most recent database transaction. So, when the business transaction commits at a later point in time, the data stored in the user tables need not be adjusted.

During the lifetime of a business transaction, the dictionary maintains all the information necessary to derive confirmed and projected versions of data from its physical state (current version) in the user tables. So, committing a business transaction just involves removing the transaction specific information from the dictionary. This step ensures that subsequent requests to derive confirmed version from the current version of the data does not take this already-committed transaction's changes into account.

A business transaction is not considered complete until the database transaction confirming the business transaction with a dbms_btx.confirm_transaction call is itself committed. That is, since the dbms_btx.confirm_transaction command is used within a database transaction, the effects of the business transaction are not made permanent until the database transaction itself is committed. This allows multiple business transactions to be committed instantaneously if necessary. The following code illustrates statements for completing two business transactions.

```
begin
    dbms_btx.resume_transaction(user_key => 'UID123456');
    dbms_btx.confirm_transaction;
    dbms_btx.resume_transaction(user_key => 'UID234567');
    dbms_btx.confirm_transaction;
end;
/
commit;
```

In addition to the user initiated commit of the transaction, a business transaction can self-commit at a preset time with an appropriate default expiry action Aborting a Business Transaction Aborting a business transaction undoes the effects of all the DML operations performed over the lifetime of the transaction. This operation uses the information consolidated in the dictionary to perform a logical undo for all the relevant data.

Since the effects of the DML operations are propagated to physical state of data that is stored in the user tables, aborting a business transaction may internally adjust all the corresponding values in these tables (See issue with data constraints below).

Just as in the case of committing a business transaction, the effects of aborting a business transaction are not made permanent until the database transaction issuing the dbms_btx.abort_transaction command is not committed. The following is an example of code for aborting a business transaction.

```
begin
    dbms_btx.resume_transaction(user_key => 'UID123456');
    dbms_btx.abort_transaction;
end;
commit;
```

Since a business transaction abort potentially modifies the values in the database (undo update operations, delete newly inserted rows and insert deleted rows), all the integrity constraints associated with the corresponding fields are evaluated. To ensure that the abort operation does not fail due to a violated uniqueness, referential or check constraint, additional checks are performed during ongoing DML operations. For instance, an INSERT operation, in addition to checking for uniqueness constraint on a column in a table, also consults the business transactions dictionary for any unconfirmed values that could potentially violate the constraint.

Data Definition Languages (DDL)

Support for Business-transactions and Operational Constraints introduces a new DDL operation in the form of dbms_btx.set_constraint interface. Setting a constraint for a column of a table is an instantaneous operation and it holds an exclusive lock on the table metadata during the call. Hence this operation can succeed only when there are no simultaneous active database transactions involving the table.

Generally, a DDL operation on a table, including the dbms_btx.set_constraint operation, does not conflict with concurrent business transactions, provided all the corresponding database transactions have ended. An operational constraint associated with a column of a table can be modified only when there are no pending business transaction changes to the column. All the corresponding business transactions should be confirmed or aborted prior to setting a new operational constraint.

According to one embodiment, an operational constraint is allowed to be modified halfway into a business transaction. However, this may result in some of the uncommitted business transactions violating these constraints. Therefore, in one embodiment, the system reevaluates the uncommitted business transactions for any violations and allows the constraint to be set only if all the transactions satisfy the new constraint.

ALTER TABLE operations modifying the column definitions in the table may be restricted if they conflict with the pending business transactions. In one embodiment, the default operational constraint is defined for any new columns added to the table.

Confirm and Abort Callbacks

In one embodiment, callback routines for Business Transaction's confirm and abort operations are employed to help perform some housekeeping operations just before completing the corresponding call. These are often necessary to complete the business logic. For example, a callback for the abort operation in a Travel Services application may result in freeing up some capacity on a flight and may wish to automatically confirm some wait-listed reservations.

A PL/SQL callback routine, which performs the necessary logic, can be created in the schema in which the business transactions operate. The callback procedure has a fixed signature with one VARCHAR argument, which is used to pass in the key for the transaction invoking the procedure. Separate callback routines may be implemented for abort and confirm operations and registered with the business transaction through transaction profiles.

```
create procedure ConfirmReservation (tx_key VARCHAR2) is
begin
    ---
    end;
    ..
    begin
    dbms_btx.create_profile(
        profile_name    => 'TravelReservation',
        expiry_int      => interval '3' day,
        expiry_act      => dbms_btx.ABORT,
        confirm_cbk     => 'ConfirmReservation',
        abort_cbk       => 'AbortReservation');
    dbms_btx.begin_transaction(
        trans_key   => 'itinerary123',
        trans_prof  => 'TravelReservation');
end;
```

The callback routines are invoked synchronously as the last step of the corresponding operation and it has access to the current database state. The callback routine is invoked outside the context of the business transaction and hence any DML operations performed within the callback are not considered to be part of the original business transaction. The transaction key passed into the callback routine may be used to associate some application-specific metadata with the transaction.

A callback procedure implementation should not perform any business transaction related operations such as begin a transaction and confirm or abort some other transaction. At the time of business transaction confirm or abort operation, if the corresponding callback routine raises some errors, the corresponding operation (confirm or abort) is canceled in entirety and business transaction remains active in the system. Only exception is when the callback routine itself has a commit (or a DDL) operation, which makes some or all of the changes permanent.

If it is desirable to auto-commit a business transaction's confirm or abort operations, a callback procedure that simply commits the transaction may be registered. The following is example code for such a procedure:

```
create procedure AutoCommitBtx (tx_key VARCHAR2) is
begin
    commit;
    end;
    begin
    dbms_btx.create_profile(
        profile_name    => 'TravelReservation',
        expiry_int      => interval '3' day,
        expiry_act      => dbms_btx.ABORT,
        confirm_cbk     => 'AutoCommitBtx',
        abort_cbk       => 'AutoCommitBtx');
end;
```

Integrity Constraints

Database systems use integrity constraints to ensure that the data stored in the database conforms to certain data quality rules across database transactions. The types of constraint supported by current database systems operate on the "states" of the database and they ensure that the constraints evaluate to true after the completion of each statement or transaction (deferred constraints). This section discusses the impact of business transactions on such constraints and also introduces Transaction constraints, which operate on the "state transitions". The Transaction constraints ensure that the database operations conform to certain process centric rules.

Data Constraints

Support for business transactions imposes a restriction on the tables with referential constraints. When the business transactions are enabled for the primary table, the foreign key table should already be enabled for business transactions. This will not only ensure that the delete rows with cascading option preserves the rows from the foreign key table but also avoids constraint violations during transaction abort. For example, rows inserted into the foreign key table will only consider confirmed values (and the values set by the active business transaction) from the primary table to validate the referential constraints. The uniqueness constraints also consult the business transactions dictionary to ensure that the constraints hold true for all possible outcomes of the business transactions.

With the above modifications, the operational characteristics of data constraints such as Referential, Unique and Primary Key remain unchanged with the support for business transactions. Each database (IT) transaction in a business transaction operates within the boundaries of these data constraints. Check constraints are automatically checked against the current version of data. When the check constraints are defined on a combination of columns, all the columns are expected to be of CATEGORY type and any DML operations on these columns are expected to operate on all the columns involved. Hence, the business transaction dictionary automatically collects and journals information about all the columns even when only a subset of the columns are modified. By considering all the columns participating in a check constraint as one unit, they are guaranteed to be valid for all possible outcomes of the business transactions.

Transaction Constraints

In addition to the constraints that ensure the quality of data at rest, business applications often enforce constraints that ensure the process correctness. These constraints, also called the transaction constraints, control the characteristics of the operations performed in a business application. In the database terms, these constraints control the database operations that transition a database from one consistent state to another.

In the database, the transaction constraints operate on all the DML activity within a transaction and could potentially restrict the commit of the transaction if it violates one or more constraints. For instance, a constraint such as "A single transaction cannot reserve more than five seats on a flight" could be enforced at the end of a business transaction using the projected and the current versions of the corresponding data. A transaction constraint may span multiple database operations that are performed in separate database transactions. For example a constraint such as "Multiple Flight segments reserved in a business transaction should at least have a 40 minute gap" will take multiple flight reservation requests (DML operations) into account to enforce it. Transaction constraints can be enforced synchronously with the DML operation or they can be deferred until the commit of the business transaction.

When each operation modifying the state of the database is considered as an event, the transaction constraints are expressed as event centric rules that relate these events in a specific pattern, such as conjunction, disjunction, temporal association and non-occurrence of events. The techniques described in U.S. patent application Ser. No. 10/815,220, filed Mar. 30, 2004, entitled "Managing event-condition-action rules in a database system", may be used to support all forms of transaction constraints.

The transaction constraints are also applicable outside the context of business transactions.

EXAMPLE USE CASE

The data classification methodologies of MEASURE and CATEGORY, when used in combination with Operational Constraints, can support most common business transactions with little or no transaction logic in the middle-tier. Applications benefiting from this technology include Inventory management, Online Retailing, Travel Services, and Banking.

For the purpose of explanation, examples shall be given hereafter based on a Travel Services application that is modeled as BPEL flow, as discussed by Clemens Utsching at clemensblog.blogspot.com/2006/03/bpel-transactions-part-2-understanding.html. For each service potentially modifying the state of the database, a compensating action is defined as a separate service. It is the responsibility of the application developer to provide the implementation for the compensation logic as well as invoke all the relevant compensation services in the exception handler.

```
<scope name="TravelServices">
    ...
    <scope name="ReserveAirline">
        <!-- define a compensation handler -->
        <compensationHandler>
            <!-- call cancel ticked -->
            <invoke  name="Invoke_CancelTicket"
                     partnerLink="AirlineBookingService"
                     portType="airline:airlineBooking"
                     operation="cancelSeat"/>
        </compensationHandler>
        <sequence name="Sequence_1">
            <invoke  name="Invoke_BookTicket"
                     partnerLink="AirlineBookingService"
                     portType="airline:airlineBooking"
                     operation="reserveSeat"/>
        </sequence>
    </scope>
    ...
    <scope name="ReserveHotel">
        <compensationHandler>
            ...
        </compensationHandler>
        <faultHandlers>
            <catch faultName="hotel:NoRoomAvailfault"
                <throw name="RollBack"
                       faultName="client:rollBackFault"/>
            </catch>
        </faultHandlers>
        <sequence name="Sequence_2"
            <invoke  name="Invoke_ReserveHotel"
                     partnerLink="hotel"
                     portType="ReservationSystem"
                     operation="bookRoom"/>
```

```
        </sequence>
      </scope>
      <scope name="ReserveCar">
        ...
      </scope>
      <faultHandlers>
        <catch faultName="client:rollbackFault">
          <compensate  name="CompensateAirlineBooking"
                       scope="ReserveAirline"/>
          <compensate  name="CompensateHotelBookings"
                       scope="ReserveHotel"/>
          <compensate  name="CompensateCarBookings"
                       scope="ReserveCar"/>
        </catch>
      </faultHandlers>
      ...
</scope>
```

The previous example assumes that the three services, ReserveAirline, ReserveHotel and ReserveCar can be invoked in any order and when a particular service request fails, compensation may be called for the other two services. Alternately, when the above operation is modeled using a database with business transaction support, the compensation logic will be handled implicitly by the database with a single "RollbackReservationTransaction" service call.

The database schema supporting the above application may have three tables to store the available resources for Airline, Hotel and Rental Cars.

```
TABLE Airline (
    flightNo        NUMBER,
    airportCode     VARCHAR(5),
    departDate      DATE,
    econCapacity    NUMBER,
    bsnsCapacity    NUMBER,
    ..);
TABLE Hotel (
    hotelId         NUMBER,
    dateResrved     DATE,
    queenCapcity    NUMBER,
    kingCapacity    NUMBER,
    ..);
```

In addition to the basic resource capacity tables, there may be other tables to store the line items for each of the resources (Seat assignment for the airline etc). So, a typical request for reserving one or more resources entails performing one or more database operations, which should all be executed within the context of a business transaction. By associating appropriate Operational Constraint and data classification methodologies for the relational tables, the "RollbackReservationTransaction" will atomically release all the resources associated with the transaction.

Not all applications have straightforward compensation logic that can be automated in the database. But for the applications that can make use of the Business transaction support in the database the added benefits include.

Centralized control in the database: Irrespective of the client performing the operation, the database enforces the constraints associated with the transaction and thus a business transaction can span multiple clients.

Little or no application code: With the compensation logic maintained in the database, the application layer need not maintain the history of operations performed in order to determine the nature of compensation and separate compensation services need not be implemented.

No loss of information: When the compensation logic is hidden in the application layer, the underlying database does not distinguish between an uncommitted resource reservation and the confirmed reservation. This could limit the database's ability to perform some complex operations such as maintain a waiting list if there are many uncommitted reservations.

Easy migration for existing applications: The business applications using short transactions for simplicity can easily migrate to business transactions with little or no coding. This is due to the fact that business transactions use standard DML syntax to manipulate the data while the constraints are applied on the data transparently.

Easy to capture business logic: The operational constraints can be used to capture complex business logic. For instance the concept of waiting list in the Airline reservation system can be easily captured in the operational constraint associated with the CurrentCapacity column. If the business logic is such that there could be as many waiting list entries as 10% of the uncommitted reservations, the following operational constraint can be defined to enforce it.

btx_current.CurrentCapacity>=btx_confirmed.Current Capacity*−0.1

In the Boolean condition specified above, if the confirmed value for the CurrentCapacity is 30, unconfirmed reservation can hold up to 33 seats, which implies that the 3 seats are from the waiting list. As more reservations are confirmed, reducing the confirmed value for the column, the capacity of the waiting list shrinks. The Boolean condition can be extended to specify a dynamic waiting list, which also shrinks with the closeness of the flight departure date.

Distributed Business Transactions

A business transaction involving related services may be distributed across database instances. For example, a travel services application may have the flight reservation, hotel reservation and car reservation hosted on different database instances. A business transaction modeled as a business transaction may hold resources from different instances with an understanding that they are all either confirmed or aborted instantaneously with no additional compensation logic.

A business transaction may be distributed to a set of homogenous systems or to a set of heterogeneous systems on the Internet. When a set of database instances capable of distributed transactions are used for a distributed business transaction, the individual database transactions within a business transaction could be private to an instance. The commands to begin and confirm/abort the business transactions are the only commands that are truly distributed. The database transaction which confirms/aborts the business transaction employs the two-phase commit protocol to atomically commit/abort the business transaction.

Handling Hot Spots in Database Transactions

Changes made in a business transaction may be "committed" to a database, but may be subsequently removed from the database if the business action fails to confirm. Thus, business transactions can be one source of "changes whose effects may be removed if one or more operations do not complete successfully". Such changes are referred to herein as in-doubt changes.

In-doubt changes also occur outside the context of business transactions. For example, all changes made by database transactions that do not belong to business transactions are in-doubt changes until the database transactions commit.

Conventionally, values that reflect in-doubt changes made by uncommitted database transactions cannot be modified by other database transactions. However, techniques shall be described hereafter to reduce contention for "hot spots" by allowing database transactions to modify values that have in-doubt changes made by other uncommitted database transactions.

The term "hot spots" generally refers to resources to which there are access restrictions, where the access restrictions result in a significant amount of contention. The most common types of hot spots are fields that maintain some aggregate quantities such as "number of seats available" or "number of items in stock". Each database transaction reserving a seat or adding an item to the shopping cart decrement the value in the corresponding aggregate field.

The frequently updated hot spot fields become a serious bottleneck to the transaction rate if normal record-locking protocol is followed. Additionally, if each database transaction updates two such fields in random order, there is a greater chance for concurrent transactions to deadlock. For example, if a database transaction attempts to add two items to the shopping cart, thereby reducing the "quantity in stock" for these items, a concurrent transaction attempting to add the same items in the reverse order will deadlock with the first transaction.

The special characteristics of the update operations on the hot spot fields, which almost always have the purpose of performing an increment or a decrement to the value, present a great opportunity to relax the record-locking protocols and hence improve the transaction rate. Each concurrent transaction can be allowed to "escrow" the desired capacity from a hot spot field and not hold an exclusive lock on the field until the end of the transaction. The operational constraints associated with the hot spot fields and the escrow operations modeled as autonomous transactions ensure semantic correctness for any possible outcome of the active transactions.

Configuring Hot Spot Fields

One or more columns in a relational table can be configured as hot spot fields using a programmatic interface. The columns identified as hot spots are invariably numerical data types that measure some aggregate values that are either incremented or decremented during normal database operations. Just as in the case of data classified as MEASURE for Business Transactions, a hot spot field has a valid range, which is enforced using operational constraints.

According to one embodiment, a new data classification methodology called VOLATILE MEASURE is used to identify hot spot columns in relational tables. For an order management application where a Resources table stores the list of items in the warehouse, a QtyAvailable column, which stores the number of items in stock, can be configured as VOLATILE MEASURE.

```
begin
   dbms_btx.set_constraint (
      table_name     => 'Resources,
      column_name    => 'QtyAvailable',
      constr_expr    =>
         'btx_current.QtyAvailable between
            BTX_MEASURE_INCR(QtyAvailable) and
               (MaxQty - BTX_MEASURE_DECR(QtyAvailable))',
      data_class     => dbms_btx.VOLATILE_MEASURE);
end;
```

Since multiple active database transactions are allowed to update the QtyAvailable column simultaneously, the btx_current version of the data and the operators, BTX_MEASURE_DECR and BTX_MEASURE_INCR, now include the effects of all escrow operations by concurrent active transactions. Note that the concurrent database transactions operating on a VOLATILE MEASURE column could be vanilla database transactions or they could be part of a Business Transaction. Hence, the system considers all possible outcomes for these transactions (database as well as business) while computing the values returned for pseudo variables and operations.

Just as in the case of business transactions, the operational constraint associated with the VOLATILE MEASURE column is enforced for all UPDATE operations on the corresponding field.

Update Operation

For an update operation incrementing or decrementing the value stored in a VOLATILE MEASURE column, a row-level lock until the end of the database transaction is avoided by performing necessary housekeeping operations in a self-committing autonomous (system) transaction. Instead of modifying the column value, the effect of the update operation is recorded in a side-table for all future validations. The information maintained in the side-table include the particulars about the field being modified, the transaction modifying it, savepoint sequence number as well as the quantity by which it is modified. This information is used to derive necessary values for constraint validation as well as make the change permanent with the commit of database transaction.

A database transaction modifying the value of a VOLATILE MEASURE column holds the lock on the corresponding row for the duration of the UPDATE statement (with autonomous transaction) and instead of updating the value, records its effect in the side table. Hence all concurrent transactions are able to simultaneously update the same column, provided they satisfy the operational constraint associated with the column. While a concurrent transaction cannot see the effects of other database transactions until commit of the corresponding transactions, within a transaction, the value returned for a VOLATILE MEASURE column include the effects of the current transaction (by defining a view and a column operator).

When an update statement modifies the value stored in a VOLATILE MEASURE column along with other columns in the table, the record is locked for the duration of the database transaction and the special handling of the hot spot columns is bypassed. While computing the amount of change (increment or decrement) performed by an update statement, the old value of the column is subtracted from the value being set. The computations are based on the confirmed value of the field and the exact method used to derive the new value is irrelevant. For example, an update statement with SET QtyAvailable=Foo(QtyAvailable), uses the resulting value from executing the Foo function (at that instance) on the current version of the QtyAvailable filed to compute the net change.

Commit of Database Transaction

A commit callback is registered when a database transaction has at least one operation on a VOLATILE MEASURE column. This callback routine makes the effect of the transaction's DML operations permanent by removing relevant journal entries, locking the relevant table rows, and performing the (deferred) update operation.

Note that the database transaction itself could be part of a business transaction, which can later be confirmed or aborted. For such cases, the journal entries are adjusted to facilitate future business transaction operations.

Savepoints and Rollback of Database Transaction

A database transaction can be rolled back, thereby undoing the effect of all DML operations performed within the transaction. Since the operations involving VOLATILE MEASURE column modified the state of the database in self-committing autonomous transactions, their effects should be undone by executing some compensating operations from a callback routine registered with the rollback command.

Optionally, one or more savepoints may be specified during the database transaction, enabling partial rollback to a particular savepoint. To facilitate rollback to a savepoint, the journal entries collected for operations on VOLATILE MEASURE columns should also maintain the order of each operation relative to various savepoints in the transaction. The callback registered with the rollback command uses the savepoint information to compensate only the operations that are performed after the savepoint.

Recovering from a Database Failure

During a normal recovery process, the state of the database is restored to that of the last successful committed transaction. This includes the effect of any autonomous transactions that are committed prior to the database failure. However, if the database system fails after the completion of a hot spot's autonomous transaction but before the completion of the corresponding user transaction, the state resulting from the recovery process is inconsistent. Since the user transaction never completed, its effects, including those on VOLATILE MEASURE columns, should be completely undone.

In the absence of a callback mechanism for recovery, a scheduler job can be defined to perform a cleanup of in-doubt transactions. If some resources are escrowed by a database transaction, which is known to be dead, this job undoes the effects of the escrow operation. The same check can also be performed when the constraint associated with the VOLATILE MEASURE column evaluates to false. For example, if the constraint evaluates to false because a quantity reaches zero, a check can be performed to see if there are any pending in-doubt transactions and reevaluate the constraints after processing the in-doubt transactions. Until all the in-doubt escrow transactions are processed, the state of the journal may be inconsistent but the value stored in the corresponding column is always consistent.

High Level Design

When a table has one of more columns of VOLATILE MEASURE type, the original table is renamed and a view with the same name as the table is created. This view has the same structure as the original table and the values are derived from the consistent value and any changes made in the transaction. The derivation is possible with an internal operator. The view has an instead of trigger that allows maintaining the journal entries without modifying the values in the table.

A commit callback implementation makes the escrow changes permanent. The journal entries specific to the volatile measure column have a transaction/session identifier that helps recover (remove the journal entries) in case of a failure.

Business Transactions—High-Level Design

One way to implement business transaction relies on existing triggers and extensibility (table function and operator) features to offer the functionality described herein. When a table is enabled for business transactions, row-level triggers are created on the table, which invoke relevant business transaction implementation for constraint validation and other housekeeping operations. Much of the complexity in this implementation is in deriving the consistent and visible versions of data being operated on. In one embodiment, a query rewritable table function BTX_CONSISTENT is defined to rewrite the user query to use special operators that derive the consistent value for each column referred in the user query.

In order to ensure that the DML activity executed within business transactions have minimal performance impact in a typical OLTP environment, the trigger-based implementation may be replaced with an integrated solution. In one embodiment, the integrated solution makes use of a business transaction handler, an operational constraints handler, and an integrity constraints handler, each of which is described in detail hereafter.

Business Transaction Handler

According to one embodiment, business transactions are implemented using a business transaction handler. The business transaction handler manages the lifecycle of business transactions in the database. According to one embodiment, the business transaction handler has the following features:

Ability to enable a table for business transaction with no metadata/data changes and minimum impact on existing applications (no new syntax for day to day operations).

Ability to begin a business transaction with a user specified name

Ability to begin a business transaction with a timeout specification and a default behavior for the transaction to confirm or abort on its own at a specified time or interval.

Ability to create reusable transaction profiles with timeout specification and callback routines for transaction confirm and abort operations.

Ability to begin a business transaction using a pre-created transaction profile.

Ability to suspend the business transaction explicitly with a call.

Ability to resume the business transaction in a database session.

Guarantee that a business transaction is active only in one session at a time.

Ability to journal relevant DML activity performed within a business transaction.

Ability to confirm the business transaction.

Ability to abort the business transaction.

Ability to invoke the callback routine at the time of transaction confirm/abort.

Ability to confirm and abort two or more business transactions atomically.

In addition, when used in the context of distributed business transaction, the business transaction handler may have the following additional features:

Ability to distribute business transactions to multiple systems with homogenous environment—E.g.: Oracle database with Business Transactions support.

Ability to choose a master among the participating systems.

Ability for a database system to join an existing business transaction on another system.

Ability to perform dedicated database transactions (non-distributed) on the corresponding systems.

Ability to for the master to initiate the confirm or abort operation on all systems participating in a distributed transaction.

Operational Constraints Handler

The operational constraints handler allows developer to define application-specific constraints that govern the validity of the shared updates performed on common data. According to one embodiment, the operation constraints handler includes the following features:

Ability to associate default constraints to the objects enabled for business transactions such that there are no lost updates (business transaction perspective).

Ability to assign application-specific constraints to each column of the table as well as a constraint for the table.

Ability to categorize columns of a table to capture the semantics of the operations performed on the table. (Data classification methodologies—MEASURE, CATEGORY etc).

Ability to express the operational constraints in SQL-WHERE clause (Boolean condition) syntax.

Ability to make use of confirmed, projected and current versions of data in the operational constraints.

Ability to use most-common SQL built-in functions in the Boolean conditions—E.g.: MOD, ABS, TO_DATE, TO_TIMESTAMP, TO_NUMBER, TO_CHAR. UPPER, LOWER and SYS_CONTEXT.

Ability to cross reference columns in the operational constraints.

Ability to handle implicit constraints for Delete operations.

Ability to compute the confirmed and projected versions of data for constraint evaluation.

Ability to journal DML activity upon successful evaluation of operational constraints.

Ability to journal all scalar types and most common non-scalar types.

Ability to add extensible data classification types with user-defined operators.

Ability to define operational constraints using extensible types and user-defined operators.

Integrity Constraints Handler

The integrity constraint handler ensures that the integrity constraints such as unique and referential constraints are enforced through all possible outcomes of business transactions.

Nested Business Transactions

The business transaction infrastructure can be used to support nested (business) transactions in the database. The begin transaction call can accept the name of an existing business transaction as its parent. The child transaction manages the DML operations performed within the transaction separate from the parent transaction. The child and parent transaction can simultaneously perform DML operations and the effects of these operations, once committed by the corresponding database transactions, are visible to each other. When the parent transaction is ended (confirmed or aborted), it implicitly ends all the active child transactions. A child transaction may end with its own confirm or abort calls and such calls have the following semantics.

When the child transaction aborts, the journal entries for the transaction are consulted to undo the changes made within the transaction.

When the child transaction confirms, the corresponding journal entries are merged with those of the parent (business) transaction such that they become part of the parent transaction. The parent transaction can later confirm or abort these operations with its own calls.

Autonomous transactions are typically used audit user operations so that the audit records are made permanent even if the database transaction is aborted. The nested business transactions are different from autonomous transactions in that a nested transaction is confirmed or aborted along with the parent transaction. So, it is not useful for auditing. However, auditing business transaction operations can be simply achieved by collecting the audit log into a table that is not enabled for shared updates. Note that the business transaction abort only undoes the operations performed on tables enabled for shared updates. So, by using a vanilla table for audit records, they are immune from business transaction abort.

Flowchart: Business Transactions

Figure 3:
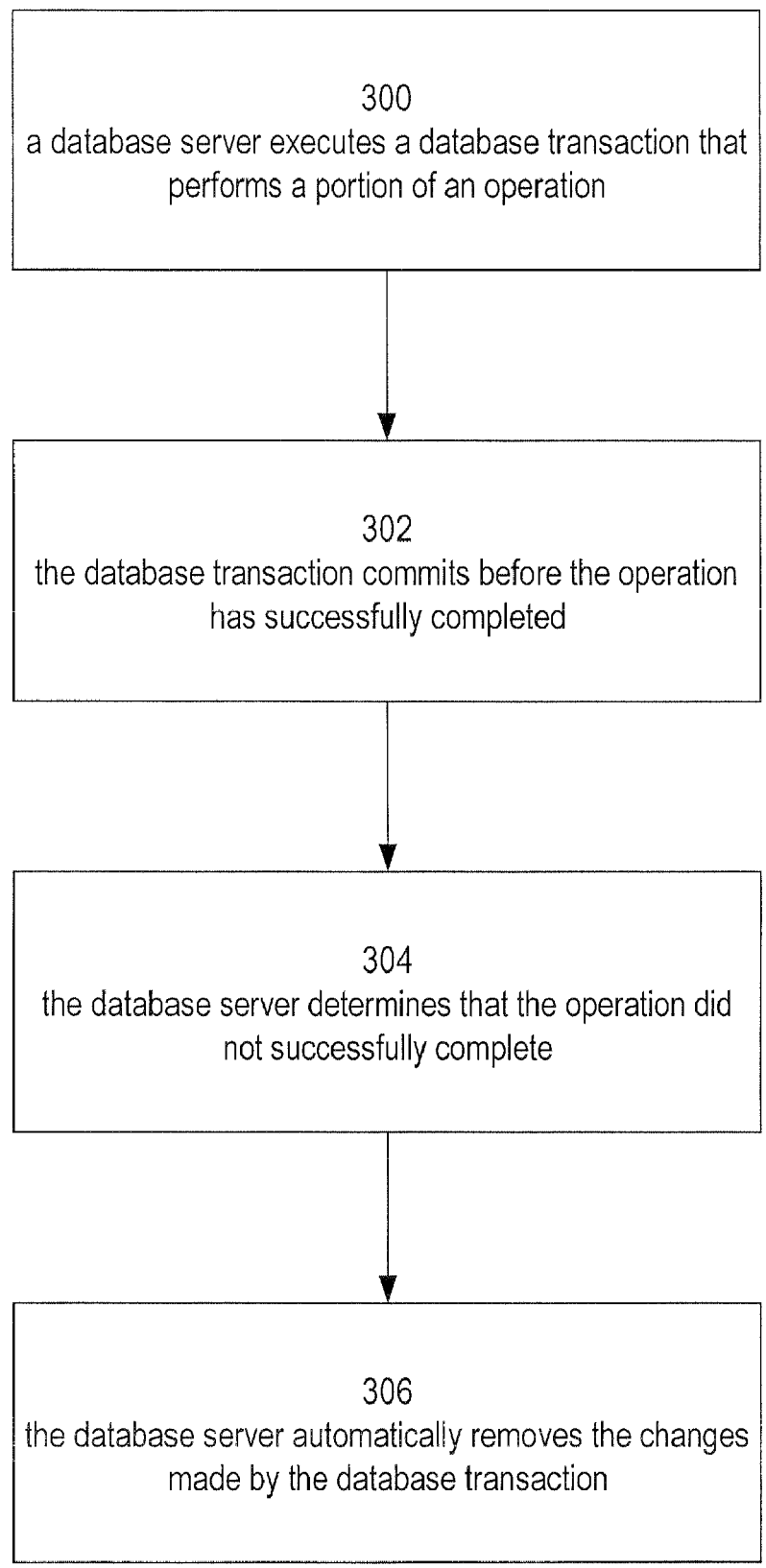
FIG. 3 is a flowchart illustrating steps that may occur when business transactions are used, according to one embodiment of the invention.

FIG. 3 is a flowchart illustrating steps that may occur when business transactions are used, according to one embodiment of the invention. At step 300, a database server executes a database transaction that performs a portion of an operation (e.g. a business transaction). At step 302, the database transaction commits before the operation has successfully completed. After changes made by the database transaction have been committed by the database server, the database server determines that the operation did not successfully complete (step 304). At step 306, in response to determining that the operation did not successfully complete, the database server automatically removes the changes made by the database transaction.

Rollback of the operation may be performed by, while the database transaction is being performed, the database server storing compensation information that indicates how to undo a relative effect of the transaction on a value changed by the transaction. Under these circumstances, the step of removing the changes made by the database transaction would include applying the compensation information to undo the relative effect of the database transaction on the value.

After the database transaction commits, and before removing the changes, the value may be changed by a second database transaction that is not part of the operation. When such is the case, the step of applying the compensation information undoes the relative effect of the database transaction on the value while retaining an effect of the change, to the value, made by the second database transaction.

Flowchart: Non-Locking Hot Spots

Figure 4:
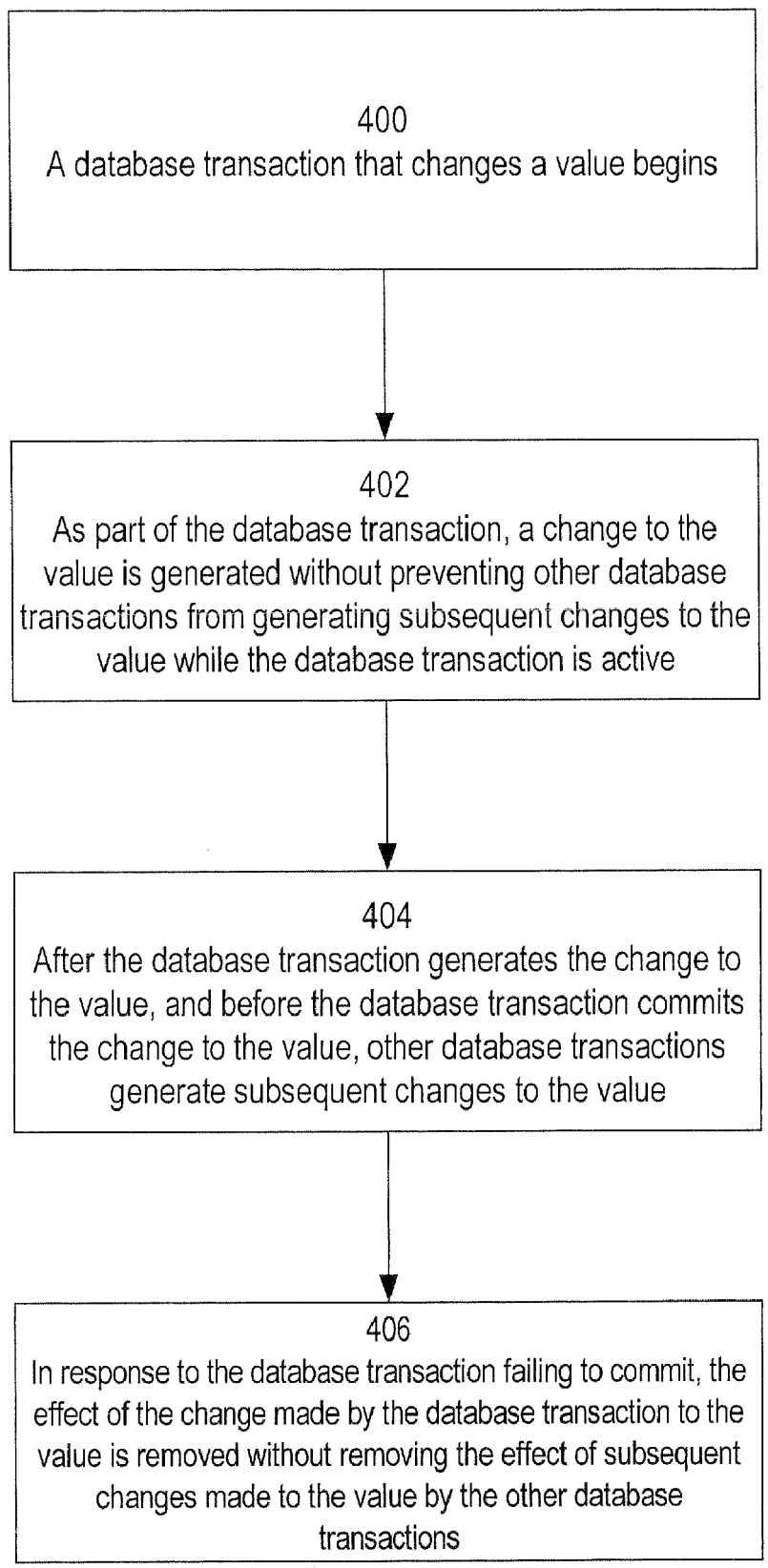
FIG. 4 is a flowchart illustrating steps of using non-locking hot spots, according to an embodiment of the invention.

FIG. 4 is a flowchart illustrating steps of using non-locking hot spots. At step 400, a database transaction that changes a value begins. As part of the database transaction, a change to the value is generated without preventing other database transactions from generating subsequent changes to the value while the database transaction is active (step 402). After the database transaction generates the change to the value, and before the database transaction commits the change to the value, other database transactions generate subsequent changes to the value (step 404). In response to the database transaction failing to commit, the effect of the change made by the database transaction to the value is removed without removing the effect of subsequent changes made to the value by the other database transactions (step 406).

The step of generating a change may include generating a change record that indicates a relative change to the value, and storing the change record separately from the value without actually changing the value. Under these conditions, the step of removing the effect of the change includes removing the change record without making the relative change specified in the change record to the value.

Alternatively, the step of generating a change may include changing the value and generating compensation data that indicates how to undo the relative effect of the change made by the database transaction to the value. In this case, the step of removing the effect of the change includes applying the compensation data to the value to undo the relative effect of the change made by the database transaction to the value, without removing the effect of changes made to the value by the other database transactions.

The value changed in step 402 may be from a column of a relational table stored in a database. According to one embodiment, metadata is stored, within the database, that indicates that transactions need not retain, until commit time, exclusive locks on values in the column after updating values in the column. The same table may include conventional columns, where transactions need to retain, until commit time, exclusive locks on values in the other columns after updating values in the other columns.

Flowchart: Operational Constraints

Figure 5:
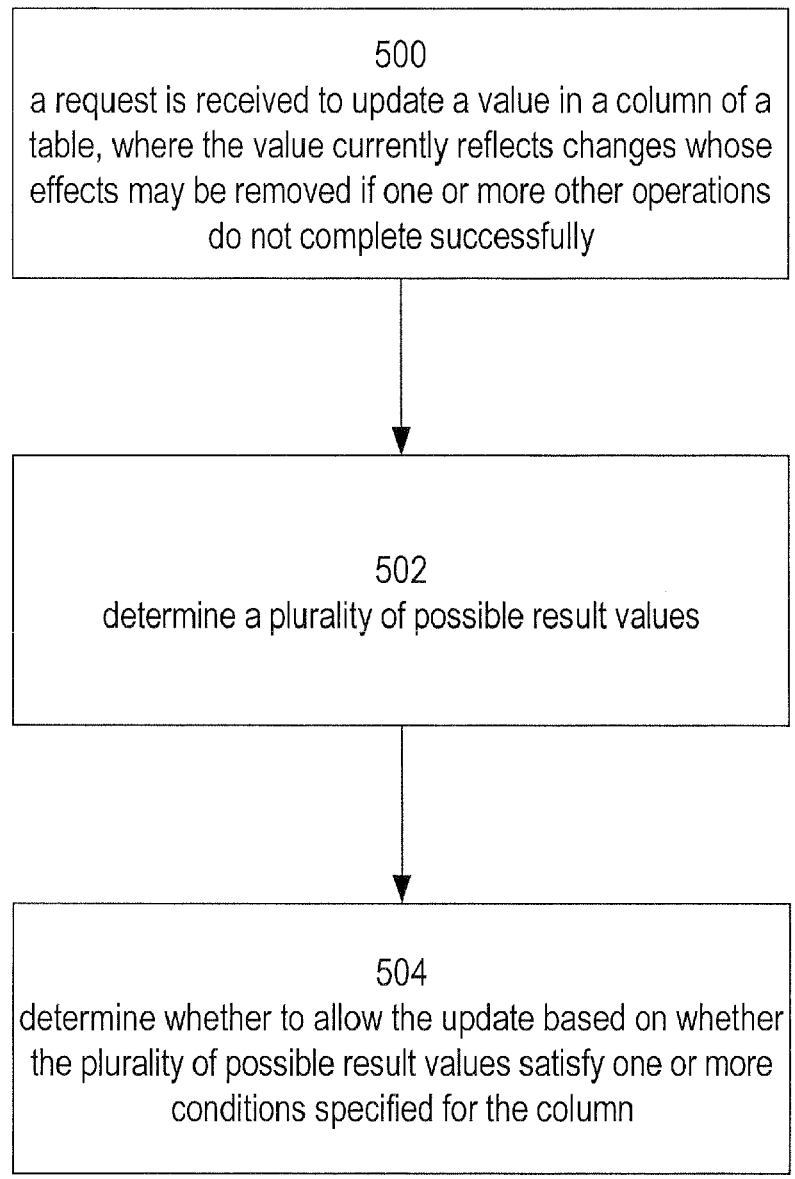
FIG. 5 is a flowchart that illustrates operations performed in a system that implements operational constraints, according to an embodiment of the invention.

FIG. 5 is a flowchart that illustrates operations performed in a system that implements operational constraints, according to an embodiment of the invention. At step 500, a request is received to update a value in a column of a table, where the value currently reflects changes whose effects may be removed if one or more other operations do not complete successfully. Such "in-doubt" changes may be changes made by uncommitted transactions, or changes made by committed transactions that are part of not-yet-confirmed business transactions.

At step 502, a plurality of possible result values are determined. In one embodiment, the possible result values include a first possible result value that assumes that the update is made and that at least one of the one or more other operations completes successfully, and a second possible result value that assumes that the update is made and that the at least one of the one or more other operations does not complete successfully.

At step 504, it is determined whether to allow the update based on whether the plurality of possible result values satisfy one or more conditions specified for the column. The conditions may be conditions that are specified, for example, in an operational constraint defined on the column.

In one embodiment, the update is denied if any of the plurality of possible result values fail to satisfy the one or more conditions specified for the column, and the update is allowed if all of the plurality of possible result values satisfy the one or more conditions specified for the column.

Input that defines an operational constraint on the column may be received from a user. Under these circumstances, determining whether the plurality of possible result values satisfy the one or more conditions includes determining whether conditions specified in the operational constraint are satisfied.

As mentioned above, the one or more other operations may include a first set of operations that increment the value and a second set of operations that decrement the value. In this case, the first possible result value assumes that all operations in the first set succeed, and that all operations in the second set fail, and the second possible result value assumes that all operations in the first set fail, and that all operations in the second set succeed. Further, the step of determining whether to allow the update includes determining whether the first possible result exceeds a maximum value specified in said one or more conditions, and determining whether the second possible result falls below a minimum value specified in said one or more conditions.

When the plurality of possible result values includes (a) at least one possible result value that violates the constraint, and (b) at least one possible result value that does not violate the constraint, then in response to determining that the plurality of possible result values includes (a) at least one possible result value that violates the constraint, and (b) at least one possible result value that does not violate the constraint, the request for the update may be placed on a waiting list.

After placing the request for the update on a waiting list, a second plurality of possible result values can be generated. In response to determining that all of the second plurality of possible result values satisfy the constraint, the request for the update may be removed from the waiting list; and the update may be performed.

On the other hand, in response to determining that none of the second plurality of possible result values satisfy the constraint, the request for the update may be removed from the waiting list, and the update fails.

For example, assume that a transaction attempts to increment a "tickets sold" value by 5 (the "requested change"). Further assume that:

the committed "tickets sold" value is 50;
the maximum "tickets sold" value is 60; and
an uncommitted transaction (or an unconfirmed business transaction) has incremented the "tickets sold" value by 8.

Under these conditions, the +8 increment is an "in-doubt" change. Under these circumstances, one possible result value of the requested change is "55" (assuming the in-doubt change fails). Another possible result value of the requested change is "63" (assuming the in-doubt change succeeds). The 55 result value does not violate the 60 maximum, but the 63 result value does violate the 60 maximum. Therefore, the requested change can be put on a waiting list, to await the resolution of the in-doubt change. If the in-doubt change fails, then all remaining possible result values do not violate the 60 maximum, so the attempted change is allowed. On the other hand, if the in-doubt change succeeds, then all remaining possible result values violate the 60 maximum, so the attempted change is fails.

Hardware Overview

Figure 6:
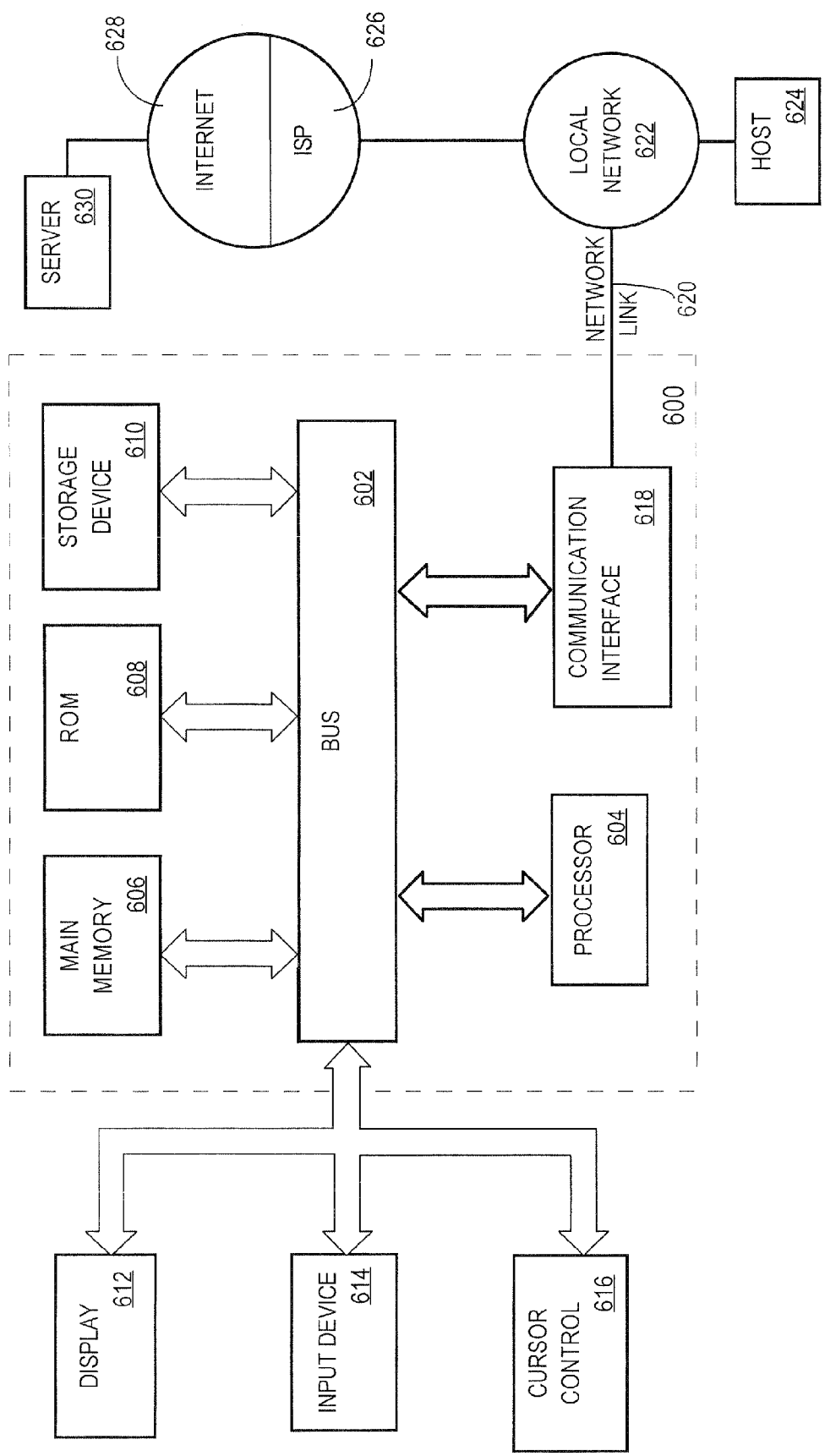
FIG. 6 is a block diagram that illustrates a system upon which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to storage media and transmission media. Storage media includes both non-volatile media and volatile media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising the computer-executed steps of:
executing, by a database server, a database transaction that performs a portion of an operation;
committing, by the database server, changes made by the database transaction before the operation has successfully completed, wherein committing changes comprises making visible to other transactions one or more values, in one or more user tables, that were changed by the database transaction;
after the changes made by the database transaction have been committed by the database server, thereby becoming already-committed changes, the database server determining that the operation did not successfully complete;
in response to determining that the operation did not successfully complete, the database server automatically removing the already-committed changes made by the database transaction;
wherein after the database transaction is committed and before the already-committed changes are removed: a second database transaction, that is not part of said operation, accesses at least one value, of the one or more values stored in the one or more user tables, that reflects the already-committed changes;
wherein the method is performed by at least one device.

2. The method of claim 1 wherein:
the method further comprises, while said database transaction is being performed, the database server storing compensation information that indicates how to undo a relative effect of the database transaction on a particular value that is changed by the database transaction; and
the step of removing the changes made by the database transaction includes applying the compensation information to undo the relative effect of the database transaction on the particular value.

3. The method of claim 1 wherein:
the database transaction is one of a plurality of database transactions, each database transaction, of the plurality of database transactions, corresponds to a distinct portion of the operation;
the database server separately commits each database transaction of the plurality of database transactions; and
the step of removing the changes includes removing the changes made by each database transaction of the plurality of database transactions.

4. A method comprising:
executing, by a database server, a database transaction that performs a portion of an operation;
committing, by the database server, changes made by the database transaction before the operation has successfully completed;
after changes made by the database transaction have been committed by the database server, the database server determining that the operation did not successfully complete;
the database server storing compensation information that indicates how to undo a relative effect of the database transaction on a value that is changed by the database transaction;
in response to determining that the operation did not successfully complete, the database server automatically removing the changes made by the database transaction;
wherein the step of removing the changes made by the database transaction includes applying the compensation information to undo the relative effect of the database transaction on the value;
wherein after the database transaction commits, and before removing the changes, the value is changed by a second database transaction that is not part of said operation; and
wherein the step of applying the compensation information undoes the relative effect of the database transaction on the value while retaining the effect of the change, to the value, made by the second database transaction;
wherein the method is performed by at least one device.

5. A method comprising:
executing, by a database server, a database transaction that performs a portion of an operation;
committing, by the database server, changes made by the database transaction before the operation has successfully completed;
after changes made by the database transaction have been committed by the database server, the database server determining that the operation did not successfully complete;
in response to determining that the operation did not successfully complete, the database server automatically removing the changes made by the database transaction;
wherein the database transaction is one of a plurality of database transactions, each database transaction of the plurality of database transactions corresponds to a distinct portion of the operation;
wherein the database server separately commits each of the plurality of database transactions;
wherein removing the changes includes removing the changes made by each of the plurality of database transactions;
wherein the plurality of the database transactions are executed discontinuously using one or more database sessions;
wherein the effects of a partial set of the plurality of database transactions are persistently stored in the database and are recoverable after a database failure; and
wherein the effects of all database operations in the plurality of database transactions are made permanent with a call that confirms all database operations atomically;
wherein the method is performed by at least one device.

6. A computer-executed method comprising:
executing a database transaction that changes a value;
as part of the database transaction, generating a change to the value without preventing other database transactions from generating subsequent changes to the value while said database transaction is active;
after the database transaction generates the change to the value, and before the database transaction commits the change to the value, other database transactions generating subsequent changes to the value; and
in response to the database transaction failing to commit, removing the effect of the change made by the database transaction to the value without removing the effect of subsequent changes made to the value by said other database transactions;
wherein the method is performed by at least one device.

7. The method of claim 6 wherein:
the step of generating the change includes generating a change record that indicates a relative change to the value, and storing the change record separately from the value without changing the value; and
the step of removing the effect of the change includes removing the change record without making the relative change specified in the change record to the value.

8. The method of claim 6 wherein:
the step of generating the change includes changing the value and generating compensation data that indicates how to undo the relative effect of the change made by the database transaction to the value; and
the step of removing the effect of the change includes applying the compensation data to the value to undo the relative effect of the change made by the database transaction to the value, without removing the effect of changes made to the value by said other database transactions.

9. The method of claim 8 wherein:
the value is from a column of a relational table stored in a database; and
the method further comprises storing metadata, within the database, that indicates that transactions need not retain, until commit time, exclusive locks on values in the column after updating values in the column.

10. The method of claim 9 wherein:
the table includes a second column; and
the metadata indicates that transactions need to retain, until commit time, exclusive locks on values in the second column after updating values in the second column.

11. A computer-executed method comprising:
receiving a request to update a value in a column of a table;
wherein the value currently reflects changes whose effects may be removed if one or more other operations do not complete successfully;
determining a plurality of possible result values, including:
a first possible result value that assumes that the update is made and that at least one of said one or more other operations completes successfully; and
a second possible result value that assumes that the update is made and that said at least one of said one or more other operations do not complete successfully; and
determining whether to allow the update based on whether the plurality of possible result values satisfy one or more conditions specified for the column;
wherein the method is performed by at least one device.

12. The method of claim 11 wherein the changes whose effects may be removed include changes made by uncommitted transactions.

13. The method of claim 11 wherein the changes whose effects may be removed include changes made by committed database transactions that are part of business applications that have not yet successfully completed.

14. The method of claim 11 further comprising, denying the update if any of the plurality of possible result values fail to satisfy the one or more conditions specified for the column.

15. The method of claim 11 further comprising, allowing the update if all of the plurality of possible result values satisfy the one or more conditions specified for the column.

16. The method of claim 11 further comprising computing summaries of all pending changes and making said summaries accessible through pseudo variables and operators.

17. The method of claim 16 wherein the step of computing summaries includes computing one or more summaries that take into account semantics of underlying data.

18. The method of claim 17 wherein the summary computed for a number field measuring capacity of a resource includes a sum of all unconfirmed increments to the value and a sum of all unconfirmed decrements to the value.

19. The method of claim 17 wherein the summary maintained for a field capturing a time-priority order among concurrent modifications is a last change to the field, which can be referenced in operational constraints on a corresponding field.

20. The method of claim 11 further comprising:
receiving, from a user, input that defines an operational constraint on the column; and
determining whether the plurality of possible result values satisfy the one or more conditions includes determining whether conditions specified in the operational constraint are satisfied.

21. The method of claim 20 wherein the operational constraint defined on the column is expressed in terms of summaries computed from the plurality of possible result values.

22. The method of claim 11 wherein:
the one or more other operations on a field measuring a capacity of some resource include a plurality of operations;
the plurality of operations include a first set of operations that increment the value and a second set of operations that decrement the value;
the first possible result value assumes that all operations in the first set succeed, and that all operations in the second set fail;
the second possible result value assumes that all operations in the first set fail, and that all operations in the second set succeed; and
the step of determining whether to allow the update includes
determining whether the first possible result exceeds a maximum value specified in said one or more conditions, and
determining whether the second possible result falls below a minimum value specified in said one or more conditions.

23. The method of claim 11 further comprising:
determining that the plurality of possible result values includes (a) at least one possible result value that violates a constraint, and (b) at least one possible result value that does not violate the constraint; and
in response to determining that the plurality of possible result values includes (a) at least one possible result value that violates the constraint, and (b) at least one possible result value that does not violate the constraint, placing the request for the update on a waiting list.

24. The method of claim 23 further comprising:
after placing the request for the update on the waiting list, generating a second plurality of possible result values; and
in response to determining that all of the second plurality of possible result values satisfy the constraint, performing the steps of:
removing the request for the update from the waiting list; and
allowing the update to be performed.

25. The method of claim 23 further comprising:
after placing the request for the update on the waiting list, generating a second plurality of possible result values; and
in response to determining that none of the second plurality of possible result values satisfy the constraint, performing the steps of:
removing the request for the update from the waiting list; and
indicating that the update failed.

26. A non-transitory computer-readable storage medium storing instructions, which when executed by one or more processors, cause the one or more processors to perform steps comprising:
- executing, by a database server, a database transaction that performs a portion of an operation;
- committing, by the database server, changes made by the database transaction before the operation has successfully completed, wherein committing changes comprises making visible to other transactions one or more values, in one or more user tables, that were changed by the database transaction;
- after the changes made by the database transaction have been committed by the database server, thereby becoming already-committed changes, the database server determining that the operation did not successfully complete;
- in response to determining that the operation did not successfully complete, the database server automatically removing the already-committed changes made by the database transaction;
- wherein after the database transaction is committed and before the already-committed changes are removed: a second database transaction, that is not part of said operation, accesses at least one value, of the one or more values stored in the one or more user tables, that reflects the already-committed changes.

27. The computer-readable storage medium of claim 26 wherein:
- the computer-readable storage medium further comprises instructions for, while said database transaction is being performed, the database server storing compensation information that indicates how to undo a relative effect of the database transaction on a particular value that is changed by the transaction; and
- the step of removing the changes made by the database transaction includes applying the compensation information to undo the relative effect of the database transaction on the particular value.

28. The computer-readable storage medium of claim 26 wherein:
- the database transaction is one of a plurality of database transactions, each database transaction, of the plurality of database transactions, corresponds to a distinct portion of the operation;
- the database server separately commits each database transaction of the plurality of database transactions; and
- the step of removing the changes includes removing the changes made by each database transaction of the plurality of database transactions.

29. A non-transitory computer-readable storage medium storing instructions, which when executed by one or more processors, cause the one or more processors to perform steps comprising:
- executing, by a database server, a database transaction that performs a portion of an operation;
- committing, by the database server, changes made by the database transaction before the operation has successfully completed;
- after changes made by the database transaction have been committed by the database server, the database server determining that the operation did not successfully complete;
- the database server storing compensation information that indicates how to undo a relative effect of the database transaction on a value that is changed by the database transaction;
- in response to determining that the operation did not successfully complete, the database server automatically removing the changes made by the database transaction;
- wherein the step of removing the changes made by the database transaction includes applying the compensation information to undo the relative effect of the database transaction on the value;
- wherein after the database transaction commits, and before removing the changes, the value is changed by a second database transaction that is not part of said operation; and
- wherein the step of applying the compensation information undoes the relative effect of the database transaction on the value while retaining the effect of the change, to the value, made by the second database transaction.

30. A non-transitory computer-readable storage medium storing instructions, which when executed by one or more processors, cause the one or more processors to perform steps comprising:
- executing, by a database server, a database transaction that performs a portion of an operation;
- committing, by the database server, changes made by the database transaction before the operation has successfully completed;
- after changes made by the database transaction have been committed by the database server, the database server determining that the operation did not successfully complete;
- in response to determining that the operation did not successfully complete, the database server automatically removing the changes made by the database transaction;
- wherein the database transaction is one of a plurality of database transactions, each database transaction of the plurality of database transactions corresponds to a distinct portion of the operation;
- wherein the database server separately commits each of the plurality of database transactions;
- wherein removing the changes includes removing the changes made by each of the plurality of database transactions;
- wherein the plurality of the database transactions are executed discontinuously using one or more database sessions;
- wherein the effects of a partial set of the plurality of database transactions are persistently stored in the database and are recoverable after a database failure; and
- wherein the effects of all database operations in the plurality of database transactions are made permanent with a call that confirms all database operations atomically.

31. A non-transitory computer-readable storage medium storing instructions, which when executed by one or more processors, cause the one or more processors to perform steps comprising:
- executing a database transaction that changes a value;
- as part of the database transaction, generating a change to the value without preventing other database transactions from generating subsequent changes to the value while said database transaction is active;
- after the database transaction generates the change to the value, and before the database transaction commits the change to the value, other database transactions generating subsequent changes to the value; and
- in response to the database transaction failing to commit, removing the effect of the change made by the database transaction to the value without removing the effect of subsequent changes made to the value by said other database transactions.

32. The computer-readable storage medium of claim 31 wherein:
- the step of generating the change includes generating a change record that indicates a relative change to the value, and storing the change record separately from the value without changing the value; and
- the step of removing the effect of the change includes removing the change record without making the relative change specified in the change record to the value.

33. The computer-readable storage medium of claim 31 wherein:
- the step of generating the change includes changing the value and generating compensation data that indicates how to undo the relative effect of the change made by the database transaction to the value; and
- the step of removing the effect of the change includes applying the compensation data to the value to undo the relative effect of the change made by the database transaction to the value, without removing the effect of changes made to the value by said other database transactions.

34. The computer-readable storage medium of claim 33 wherein:
- the value is from a column of a relational table stored in a database; and
- the computer-readable storage medium further comprises instructions for storing metadata, within the database, that indicates that transactions need not retain, until commit time, exclusive locks on values in the column after updating values in the column.

35. The computer-readable storage medium of claim 34 wherein:
- the table includes a second column; and
- the metadata indicates that transactions need to retain, until commit time, exclusive locks on values in the second column after updating values in the second column.

36. A non-transitory computer-readable storage medium storing instructions, which when executed by one or more processors, cause the one or more processors to perform steps comprising
- receiving a request to update a value in a column of a table;
- wherein the value currently reflects changes whose effects may be removed if one or more other operations do not complete successfully;
- determining a plurality of possible result values, including
  - a first possible result value that assumes that the update is made and that at least one of said one or more other operations completes successfully; and
  - a second possible result value that assumes that the update is made and that said at least one of said one or more other operations does not complete successfully; and
- determining whether to allow the update based on whether the plurality of possible result values satisfy one or more conditions specified for the column.

37. The computer-readable storage medium of claim 36 wherein the changes whose effects may be removed include changes made by uncommitted transactions.

38. The computer-readable storage medium of claim 36 wherein the changes whose effects may be removed include changes made by committed database transactions that are part of business applications that have not yet successfully completed.

39. The computer-readable storage medium of claim 36 further comprising instructions for denying the update if any of the plurality of possible result values fail to satisfy the one or more conditions specified for the column.

40. The computer-readable storage medium of claim 36 further comprising instructions for allowing the update if all of the plurality of possible result values satisfy the one or more conditions specified for the column.

41. The computer-readable storage medium of claim 36 further comprising instructions for computing summaries of all pending changes and making said summaries accessible through pseudo variables and operators.

42. The computer-readable storage medium of claim 41 wherein the step of computing summaries includes computing one or more summaries that take into account semantics of underlying data.

43. The computer-readable storage medium of claim 42 wherein the summary computed for a number field measuring capacity of a resource includes a sum of all unconfirmed increments to the value and a sum of all unconfirmed decrements to the value.

44. The computer-readable storage medium of claim 42 wherein the summary maintained for a field capturing a time-priority order among concurrent modifications is a last change to the field, which can be referenced in operational constraints on a corresponding field.

45. The computer-readable storage medium of claim 36 further comprising instructions for:
- receiving, from a user, input that defines an operational constraint on the column; and
- determining whether the plurality of possible result values satisfy the one or more conditions includes determining whether conditions specified in the operational constraint are satisfied.

46. The computer-readable storage medium of claim 45 wherein the operational constraint defined on the column is expressed in terms of summaries computed from the plurality of possible result values.

47. The computer-readable storage medium of claim 36 wherein:
- the one or more other operations on a field measuring a capacity of some resource include a plurality of operations;
- the plurality of operations include a first set of operations that increment the value and a second set of operations that decrement the value;
- the first possible result value assumes that all operations in the first set succeed, and that all operations in the second set fail;
- the second possible result value assumes that all operations in the first set fail, and that all operations in the second set succeed; and
- the step of determining whether to allow the update includes
  - determining whether the first possible result exceeds a maximum value specified in said one or more conditions, and
  - determining whether the second possible result falls below a minimum value specified in said one or more conditions.

48. The computer-readable storage medium of claim 36 further comprising instructions for:
- determining that the plurality of possible result values includes (a) at least one possible result value that violates a constraint, and (b) at least one possible result value that does not violate the constraint; and
- in response to determining that the plurality of possible result values includes (a) at least one possible result value that violates the constraint, and (b) at least one possible result value that does not violate the constraint, placing the request for the update on a waiting list.

49. The computer-readable storage medium of claim 48 further comprising instructions for:

after placing the request for the update on the waiting list, generating a second plurality of possible result values; and in response to determining that all of the second plurality of possible result values satisfy the constraint, performing the steps of:

removing the request for the update from the waiting list; and allowing the update to be performed.

50. The computer-readable storage medium of claim 48 further comprising instructions for:

after placing the request for the update on the waiting list, generating a second plurality of possible result values; and in response to determining that none of the second plurality of possible result values satisfy the constraint, performing the steps of:

removing the request for the update from the waiting list; and indicating that the update failed.

* * * * *

UNITED STATES PATENT AND TRADEMARK OFFICE
CERTIFICATE OF CORRECTION

| | | |
|---|---|---|
| PATENT NO. | : 7,904,434 B2 | Page 1 of 1 |
| APPLICATION NO. | : 12/102831 | |
| DATED | : March 8, 2011 | |
| INVENTOR(S) | : Yalamanchi et al. | |

It is certified that error appears in the above-identified patent and that said Letters Patent is hereby corrected as shown below:

In column 2, line 28, delete "invention." and insert -- invention; --, therefor.

In column 4, line 59, delete "(CurrentCapcity" and insert -- (CurrentCapacity --, therefor.

In column 9, line 50, delete "confimed" and insert -- confirmed --, therefor.

In column 18, line 60, after "action" insert -- . --.

In column 23, line 39, delete "dateResrved" and insert -- dateReserved --, therefor.

In column 23, line 40, delete "queenCapcity" and insert -- queentCapacity --, therefor.

In column 28, line 39, after "name" insert -- . --.

Signed and Sealed this
Fourth Day of October, 2011

David J. Kappos
*Director of the United States Patent and Trademark Office*